(12) United States Patent
Nakao

(10) Patent No.: US 7,694,585 B2
(45) Date of Patent: Apr. 13, 2010

(54) STRAIGHT TUBE TYPE CORIOLIS FLOWMETER FOR TERTIARY MODE VIBRATION WITH ELASTIC CONNECTION MEMBER AND PEDESTAL

(75) Inventor: Yuichi Nakao, Tokyo (JP)

(73) Assignee: Oval Corporation, Tokyo (JP)

( * ) Notice: Subject to any disclaimer, the term of this patent is extended or adjusted under 35 U.S.C. 154(b) by 209 days.

(21) Appl. No.: 11/920,436

(22) PCT Filed: Sep. 8, 2006

(86) PCT No.: PCT/JP2006/318324

§ 371 (c)(1),
(2), (4) Date: Nov. 15, 2007

(87) PCT Pub. No.: WO2007/032457

PCT Pub. Date: Mar. 22, 2007

(65) Prior Publication Data

US 2009/0084195 A1    Apr. 2, 2009

(30) Foreign Application Priority Data

Sep. 13, 2005   (JP) ............................. 2005-264630

(51) Int. Cl.
*G01F 1/84* (2006.01)

(52) U.S. Cl. ................................. 73/861.357

(58) Field of Classification Search ............... None
See application file for complete search history.

(56) References Cited

U.S. PATENT DOCUMENTS 7,437,949 B2 * 10/2008 Nakao et al. ............ 73/861.355

FOREIGN PATENT DOCUMENTS

| JP | 3096181 | 8/2000 |
| JP | 3431923 | 5/2003 |
| JP | 2004-509349 | 3/2004 |
| JP | 2007147417 A * | 6/2007 |

OTHER PUBLICATIONS

International Search Report issued Oct. 24, 2006 in the International (PCT) Application of which the present application is the U.S. National Stage.

* cited by examiner

*Primary Examiner*—Harshad Patel
(74) *Attorney, Agent, or Firm*—Wenderoth, Lind & Ponack, L.L.P.

(57) ABSTRACT

A straight tube type Coriolis flowmeter is equipped with a straight-tube-type flow tube, a drive device for driving by a tertiary mode vibration, a pair of detection unit for detecting a phase difference proportional to a Coriolis force, a pedestal having rigidity, and elastic connection members having elasticity. Assuming that an axial direction of the flow tube is a Z-axis, that a driving direction of the drive device is an X-axis, and that a direction orthogonal to the Z-axis and the X-axis is a Y-axis, the elastic connection members are of a structure exhibiting lower rigidity in the Z-axis direction than in the X-axis direction and the Y-axis direction, and exhibiting lower rigidity in a direction of rotation around the Y-axis than in a direction of rotation around the Z-axis and a direction of rotation around the X-axis.

13 Claims, 15 Drawing Sheets

FIG. 1
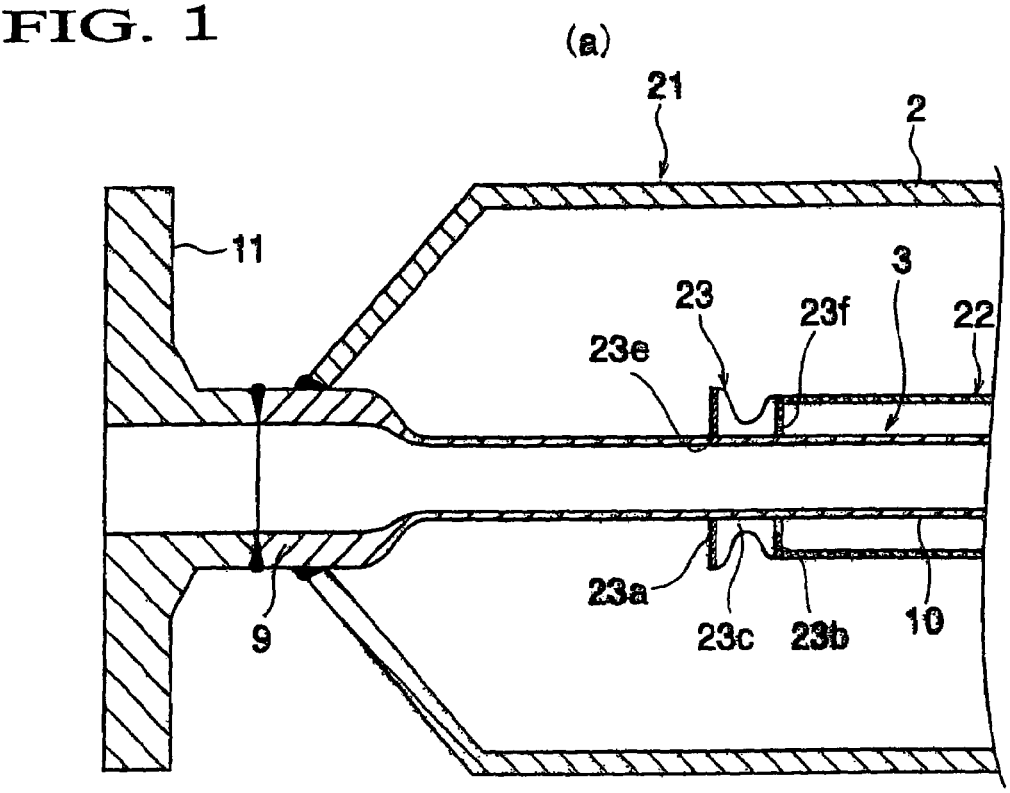
(a)
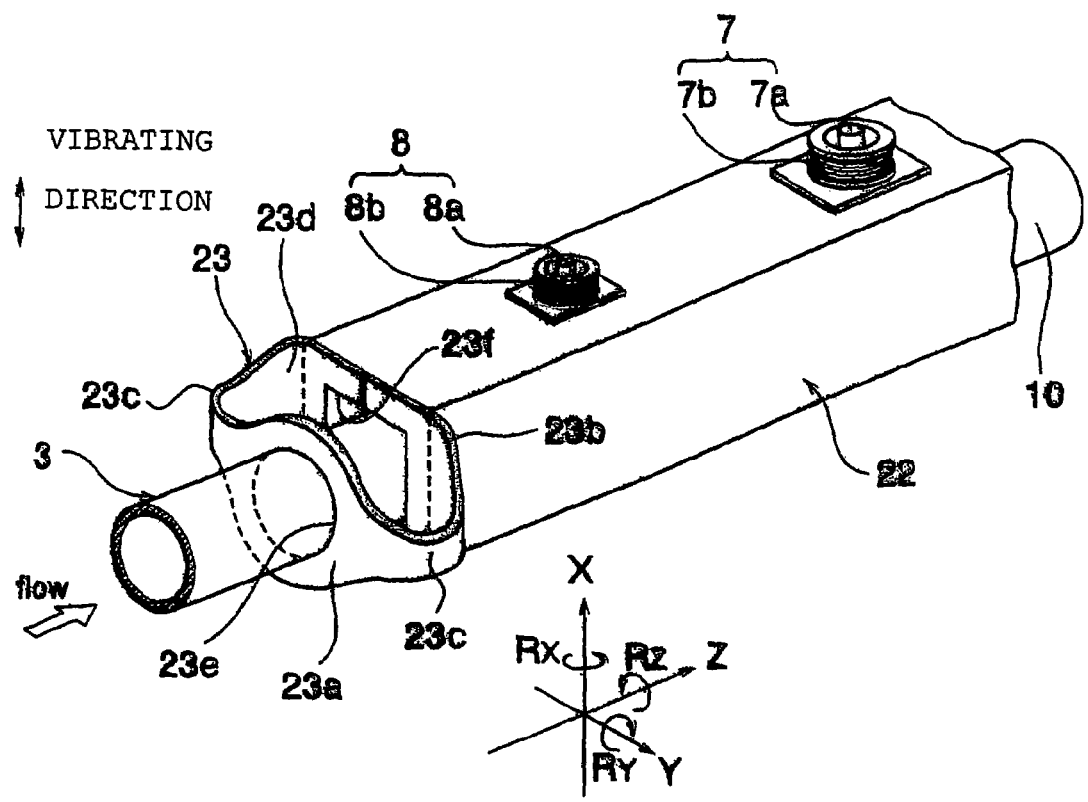
(b)

FIG. 9
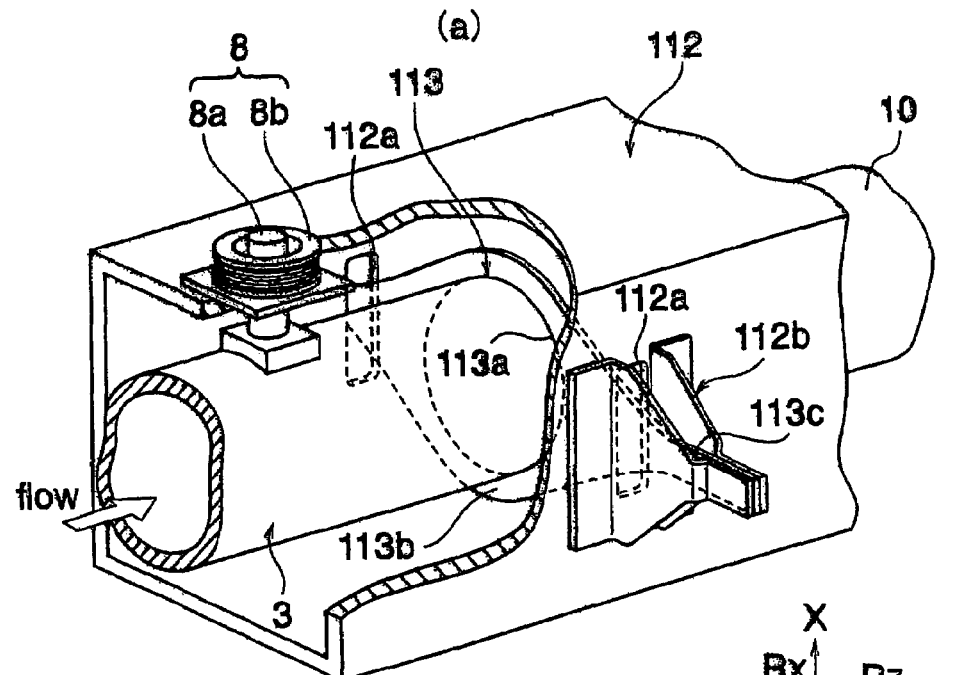
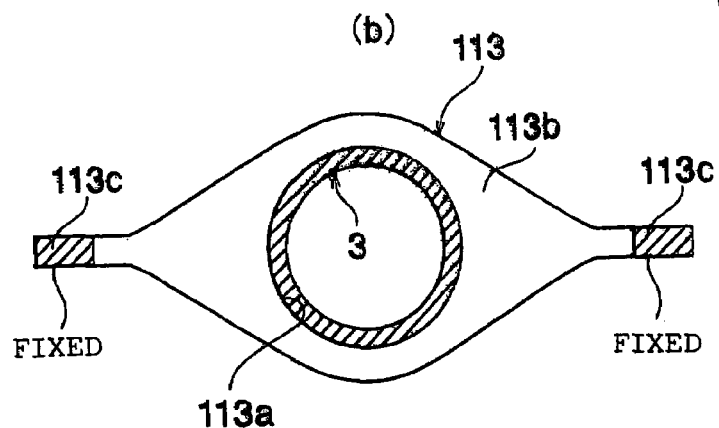
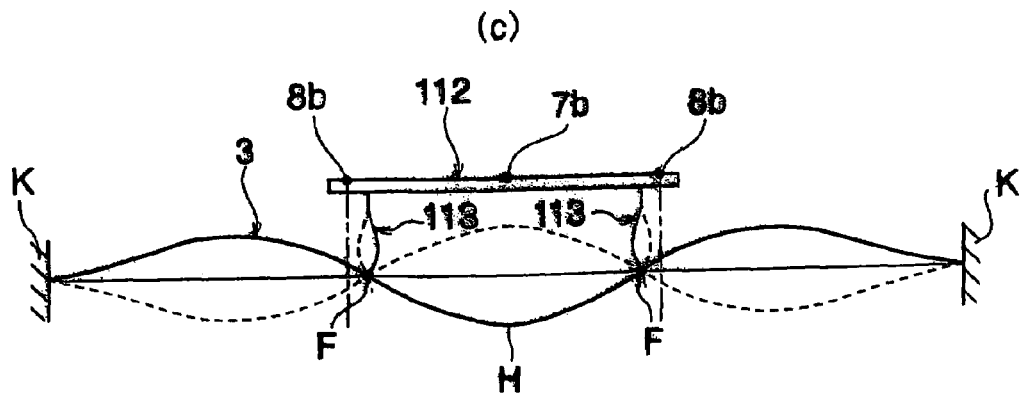

FIG. 10
(a)
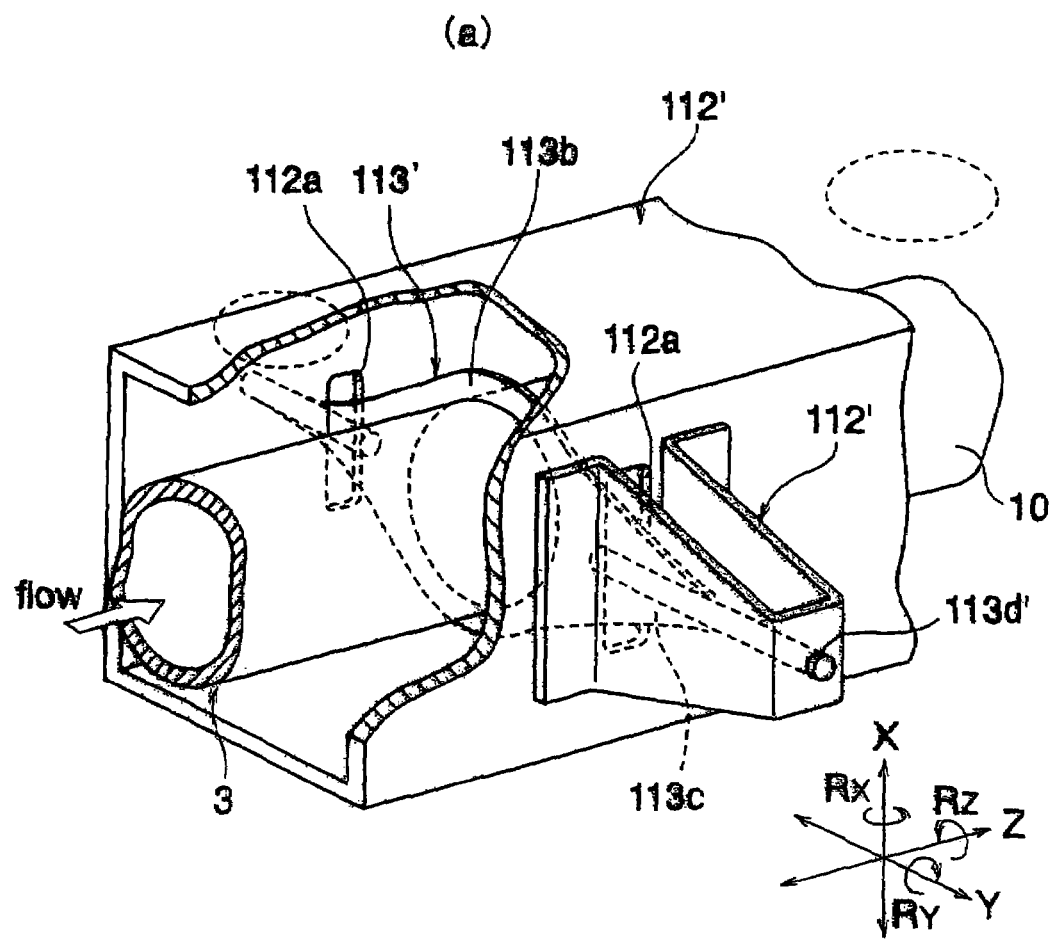
(b)
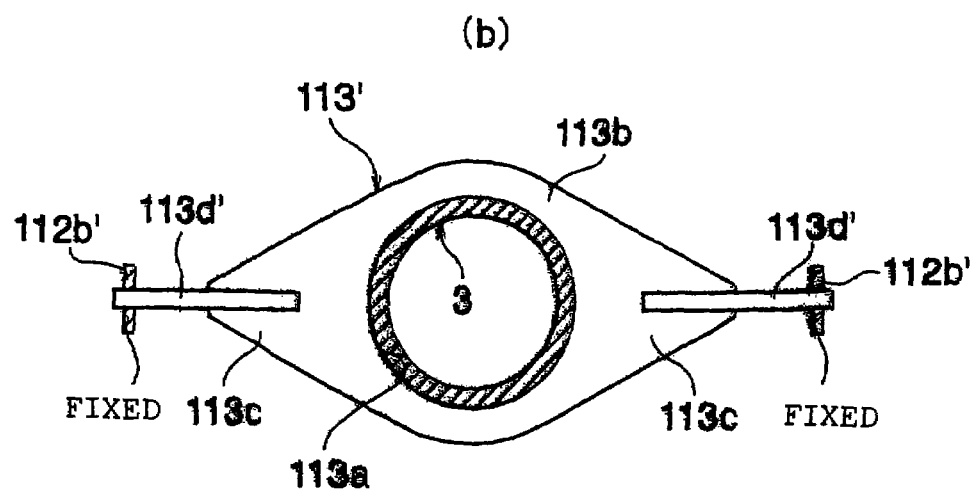

STRAIGHT TUBE TYPE CORIOLIS FLOWMETER FOR TERTIARY MODE VIBRATION WITH ELASTIC CONNECTION MEMBER AND PEDESTAL

TECHNICAL FIELD

The present invention relates to a straight tube type Coriolis flowmeter which obtains the mass flow rate and/or density of a fluid to be measured by detecting a phase difference and/or vibration frequency proportional to a Coriolis force acting on a flow tube. More specifically, the present invention relates to a straight tube type Coriolis flowmeter adapted to vibrate a straight tube (flow tube) in a tertiary mode and equipped with an elastic connection member and a pedestal.

BACKGROUND ART

In a straight tube type Coriolis flowmeter, when a vibration is applied to a straight tube (flow tube), supported at both ends, in a direction perpendicular to the straight-tube center portion axis, there is obtained between the support portions and the central portion of the straight tube a difference in displacement of the straight tube due to a Coriolis force, that is, a phase difference signal, based on which the mass flow rate is detected. The straight tube type Coriolis flowmeter has a simple, compact and solid structure (see, for example, JP 2786829 B).

In FIG. 13, a conventional straight tube type Coriolis flowmeter 1 has an outer cylinder 2, a flow tube (inner tube) 3, a counter balance (outer tube) 4, connection blocks 5, plate springs 6, a drive device 7, detectors (detecting means), and a weight (not shown). The flow tube 3 has at its both ends divergent opening portions 9 of a trumpet-like configuration. Further, the flow tube 3 has a straight tube portion 10 between the divergent opening portions 9 at both ends.

On the outer side of the straight tube portion 10 of the flow tube 3, there is provided the counter balance 4. The straight tube portion 10 of the flow tube 3 and the counter balance 4 are coaxially joined together at both ends of the counter balance 4 by the connection blocks 5. The connection blocks 5 are provided as rigid members. A double tube structure is formed by the straight tube portion 10 and the counter balance 4. The outer cylinder 2 is formed so as to be capable of accommodating the double tube structure. Both end portions of the outer cylinder 2 are formed so as to be reduced in diameter toward the divergent opening portions 9 of the flow tube 3. Both end portions of the outer cylinder 2 are welded to the divergent opening portions 9. Both end portions of the outer cylinder 2 and the divergent opening portions 9 are fixed to each other in a liquid tight fashion. Connection flanges 11 are welded to the open ends of the divergent opening portions 9. The divergent opening portions 9 are formed so as to exert a spring action.

Each plate spring 6 has a surface orthogonal to the straight tube portion 10; one end of the surface is fixed to the connection block 5, and the other end thereof is fixed to the inner wall of the outer cylinder 2. Further, the plate springs 6 are arranged so as to be orthogonal to the direction of resonance vibration. The drive device 7 is mounted to the position at the center of the flow tube 3 and of the counter balance 4. The drive device 7 drives the straight tube portion 10 of the flow tube 3 and the counter balance 4 at coupled vibration frequencies of opposite phases. The detectors 8 are mounted at positions symmetrical with respect to the drive device 7. The weight (not shown) is mounted at a position on the opposite side of the drive device 7. More specifically, the weight (not shown) is mounted at a position in the driving direction of the drive device 7. The weight (not shown) is provided so as to allow an adjustment to equalize the natural frequency of the flow tube 3 around the connection blocks 5 with the natural frequency of the counter balance 4.

In the above-mentioned construction, the resonance system including the flow tube 3 and the counter balance 4 is supported by the plate springs 6. The divergent opening portions 9 at the ends of the straight tube portion 10 extending from the resonance system are supported at the positions of the connection flanges 11. Thus, the flow tube 3 is supported at a plurality of points. In the straight tube type Coriolis flowmeter 1, constructed as described above, a fluid to be measured (not shown) is caused to flow through the flow tube 3, and in this state, the drive device is resonance-driven to detect a phase difference signal proportional to a Coriolis force with the detectors 8, whereby the mass flow rate can be measured. In the straight tube type Coriolis flowmeter 1, a standing wave is formed in the resonance system through resonance driving of the drive device 7 mentioned support points constitute vibration nodes.

In the conventional straight tube type Coriolis flowmeter 1, in order to achieve an improvement in vibration resistance and to eliminate vibration leakage, there is provided a mass point vibrated in a direction opposite to the vibration of the flow tube 3, i.e., the counter balance 4, thereby counterbalancing the vibration. Further, in the conventional straight tube type Coriolis flowmeter 1, the drive device 7 and the detectors 8 are installed not on the outer cylinder 2 but on the counter balance 4, and the counter balance 4 with the drive device 7 and the detectors 8 installed thereon is fixed not to the outer cylinder 2 but at two positions of the flow tube 3 through the intermediation of the connection blocks 5.

(It is a structure for preventing direct superimposition of noise on detectors 8 when external disturbance acts on straight tube type Coriolis flowmeter 1. Further, it is a structure for making a lower bending vibration which is the most liable to occur (the principal mode generated by external disturbance) different from the drive mode.) Further, in the conventional straight tube type Coriolis flowmeter 1, the plate springs 6 are provided to fix the connection blocks 5 in position, with the result that the directional properties of the vibration are determined. (Due to the provision of plate springs 6, a rotation center exists in each connection block 5 during vibration.)

In the conventional straight tube type Coriolis flowmeter 1, constructed as described above, the connection blocks 5 connecting the flow tube 3 and the counter balance 4 are rigid as stated above, which leads to the following problem. When an axial force is generated in the flow tube 3, local stress is generated between the pair of connection blocks 5 and between the ends of the flow tube 3 and the connection blocks 5, and in some cases, some stress remains in the flow tube 3, or there is a fear of the flow tube 3 undergoing plastic deformation.

In the following, an axial stress acting on the flow tube 3 will be described with reference to a schematic diagram. In the following description, to clarify the problem caused by the axial stress, the function (spring action) of the divergent opening portions 9 will be ignored. FIGS. 14 (a) through 14 (d) are schematic diagrams each showing the condition of the flow tube 3 and the counter balance 4 when the temperature of the fluid flowing through the flow tube 3 is raised, and FIG. 14(e) is a perspective view showing the positional relationship between the flow tube 3, the counter balance 4, the connection block 5, and the plate spring 6.

When the fluid to be measured is passed through the flow tube 3 and the drive device 7 is resonance-driven, the flow tube 3 and the counter balance 4 vibrate in loci as shown in FIG. 14(*a*). In a state in which the temperature of the fluid to be measured is not raised, the temperature of the whole is uniform (i.e., there is no temperature change). In this state, no axial stress has been generated yet between the pair of connection blocks 5 and between the ends of the flow tube 3 and the connection blocks 5. (During driving, however, stress due to vibration is separately exerted.)

When the fluid to be measured is continuously passed and its temperature is raised, there is generated in the flow tube 3, as a result of a temperature change, a force by which the flow tube 3 is axially expanded. In contrast, in the counter balance 4, to which the heat due to the temperature change has not been conducted to a sufficient degree, no such expansion force as that in the flow tube 3 is generated, with the result that the distance between connection blocks 5 remains substantially the same. Thus, as shown in FIG. 14(*b*), in the flow tube 3, there is generated, apart from the stress due to vibration, a local axial stress leading to compression.

When, thereafter, the counter balance 4, which has adapted itself to the heat due to the temperature change, expands in the axial direction, the distance between the connection blocks 5 increases in accordance therewith, and the axial stress that has generated between the connection blocks 5 is mitigated as shown in FIG. 14(*c*). However, in contrast, the axial stress leading to compression between the ends of the flow tube 3 and the connection blocks 5 increases, so a large local axial stress is exerted on the flow tube 3.

When the temperature of the whole becomes uniform, and the distance between the fixed ends of the flow tube 3 is increased, axial stress ceases to exist in the flow tube 3 as a whole as shown in FIG. 14(*d*), with the result that a stable state is attained.

FIGS. 15 (*a*) through 15 (*d*) are schematic diagrams showing the condition of the flow tube 3 and the counter balance 4 when the temperature of the fluid to be measured flowing through the flow tube 3 is lowered. FIG. 15 (*a*) shows a state in which the temperature of the fluid to be measured is high, and the temperature of the whole is uniform; in this state, no axial stress acts on the flow tube 3 as a whole.

When the temperature of the fluid to be measured is lowered, there is generated in the flow tube 3, as a result of the temperature change, a force by which the flow tube 3 is axially contracted.

In contrast, no change is to be observed in the length of the counter balance 4, that is, the distance between the connection blocks 5 and the distance between the fixed ends of the flow tube 3. As shown in FIG. 15(*b*), there is exerted on the flow tube 3 a local axial stress leading to tension.

When, thereafter, the counter balance 4, which has adapted itself to the heat due to the temperature change, is axially contracted, the distance between the connection blocks 5 is reduced in accordance therewith. As shown in FIG. 15(*c*), the axial stress generated between the connection blocks 5 is mitigated. However, in contrast, the axial stress leading to tension between the ends of the flow tube 3 and the connection blocks 5 increases, so a large local axial stress is exerted on the flow tube 3.

When the temperature of the whole becomes uniform, and the distance between the fixed ends of the flow tube 3 is reduced, axial stress ceases to exist in the flow tube 3 as a whole as shown in FIG. 15(*d*), with the result that a stable state is attained.

As can be understood from the above illustration, in the conventional straight tube type Coriolis flowmeter 1, the axial stress acting on the flow tube 3 is not easily dispersed in the tube axis direction. Thus, the conventional straight tube type Coriolis flowmeter 1 is vulnerable to temperature change.

SUMMARY OF THE INVENTION

The present invention has been made in view of the above-mentioned problem in the prior art. It is an object of the present invention to provide a straight tube type Coriolis flowmeter allowing dispersion of axial stress exerted on the flow tube.

A straight tube type Coriolis flowmeter for tertiary mode vibration with an elastic connection member and a pedestal of the present invention, which has been made to solve the above-mentioned problem, is characterized by including: a straight-tube-type flow tube through which a fluid to be measured flows; a drive device for driving the flow tube by a tertiary mode vibration; a pair of detection means for detecting a phase difference proportional to a Coriolis force acting on the flow tube; a rigid pedestal situated on the outer side of the flow tube while keeping coils of the drive device and of the pair of detection means fixed in position; and a pair of elastic connection members connecting the pedestal to the flow tube at two predetermined positions of the flow tube, in which, assuming that an axial direction of the flow tube is a Z-axis, that a driving direction of the drive device orthogonal to the Z-axis is an X-axis, and that a direction orthogonal to the Z-axis and the X-axis is a Y-axis, the elastic connection members are of a structure exhibiting lower rigidity in the Z-axis direction than in the X-axis direction and the Y-axis direction, and exhibiting lower rigidity in a direction of rotation around the Y-axis than in a direction of rotation around the Z-axis and a direction of rotation around the X-axis.

A straight tube type Coriolis flowmeter for tertiary mode vibration with an elastic connection member and a pedestal of the present invention, is further characterized in that: each of the elastic connection members has a first wall portion continuous with the flow tube, a second wall portion continuous with the pedestal, and a pair of continuous wall portions continuous respectively with the first wall portion and the second wall portion at end portions in the Y-axis direction; the first wall portion and the second wall portion are opposed to each other at an interval; and end portions in the X-direction of each elastic connection member are open by virtue of the interval.

A straight tube type Coriolis flowmeter for tertiary mode vibration with an elastic connection member and a pedestal of the present invention, is further characterized in that each of the elastic connection members is structured such that a width in the X-axis direction of the continuous wall portions is smaller than a width in the X-axis direction of the first wall portion and the second wall portion.

A straight tube type Coriolis flowmeter for tertiary mode vibration with an elastic connection member and a pedestal of the present invention, is further characterized in that: the elastic connection members are of a spindle-shaped flat-plate structure continuous with the flow tube; and the pedestal is provided with brackets for fixing in position end portions in the Y-axis direction of the elastic connection members protruding to an exterior of the pedestal through openings of the pedestal.

A straight tube type Coriolis flowmeter for tertiary mode vibration with an elastic connection member and a pedestal of the present invention, is further characterized in that the pedestal is a tubular member of a rectangular sectional configuration.

A straight tube type Coriolis flowmeter for tertiary mode vibration with an elastic connection member and a pedestal of the present invention, is further characterized in that the flow tube, the pedestal, and the elastic connection members are structures of the same coefficients of linear expansion.

According to the present invention, as the drive mode for the flow tube, there is adopted a tertiary mode bending vibration. The reason for adopting a tertiary mode vibration is that it is a drive mode making it possible to minimize vibration leakage even if there is no counter balance as provided in the prior art. The pedestal for fixing each coil of the drive device and the detection means in position is provided with elastic connection members situated at, for example, two positions constituting the node positions of the tertiary mode inherent in the flow tube. This pedestal is provided as a member which does not vibrate even when the drive device is driven to vibrate the flow tube and can be maintained at a fixed position. Apart from a cylindrical structure, to achieve an enhancement in rigidity, the present invention also adopts a pedestal structure which is formed as a tube of a rectangular sectional configuration.

The elastic connection members are provided in order to connect the pedestal to the flow tube. Further, the elastic connection members are provided in order to disperse allover the axial stress exerted on the flow tube. The elastic connection members are provided as members useful in realizing a structure resistant to temperature change. The structure of the elastic connection members are determined so as to exhibit low rigidity in the axial direction of the flow tube and high rigidity in the other directions. Further, in order not to hinder the tertiary-mode vibration motion, the structure of the elastic connection members is determined so as to constitute rotatable support ends with respect to the vibrating direction.

Further, in the present invention, in order to attain a structure further resistant to temperature change, it is desirable for the coefficients of linear expansion of the flow tube, the pedestal, and the elastic connection members to be the same. The detection means is not restricted to the construction including a coil and magnet. It may be a means for detecting one of displacement, speed, and acceleration, such as an acceleration sensor, an optical means, a capacitance type means, or a strain type (piezoelectric type) means.

In the present invention, it is possible to disperse the axial stress acting on the flow tube. Thus, as compared with the prior art, it is possible to achieve an improvement in terms of resistance to temperature change otherwise, in the present invention, it is possible to eliminate the need for the counter balance, which has been used. As a result, it is possible to eliminate the unbalance caused by a change in the density of the fluid to be measured and by the moment of inertia (mass) of the counter balance, that is, the unbalance due to the fact that the moment of inertia of the counter balance remains fixed if the density of the fluid to be measured is changed. Thus, it is possible to eliminate instrumental error shift, variation, and further, the shift with respect to density measurement (frequency).

In the present invention, it is possible to provide a still better mode of the elastic connection members. Further, in the present invention, it is also possible to enhance the rigidity of the pedestal. Further, in the present invention, it is also possible to eliminate variation between the members in the expansion/contraction due to temperature changes.

BRIEF DESCRIPTION OF THE DRAWINGS

FIG. 1 is a diagram showing a straight tube type Coriolis flowmeter for tertiary mode vibration with an elastic connection member and a pedestal according to an embodiment of the present invention, of which portion (a) is a sectional view of the straight tube type Coriolis flowmeter, and portion (b) is a perspective view showing the positional relationship between the flow tube, the pedestal, and the elastic connection member.

FIG. 9(a) is a perspective view of another example of the elastic connection member and the pedestal of FIG. 1, FIG. 9(b) is a front view of the elastic connection member, and FIG. 9(c) is an explanatory view of a fixation position for a detector.

FIG. 10(a) is a perspective view of another example of the elastic connection member and the pedestal of FIG. 9, and FIG. 10 (b) is a front view of the elastic connection member.

DETAILED DESCRIPTION OF THE INVENTION

Figure 2:
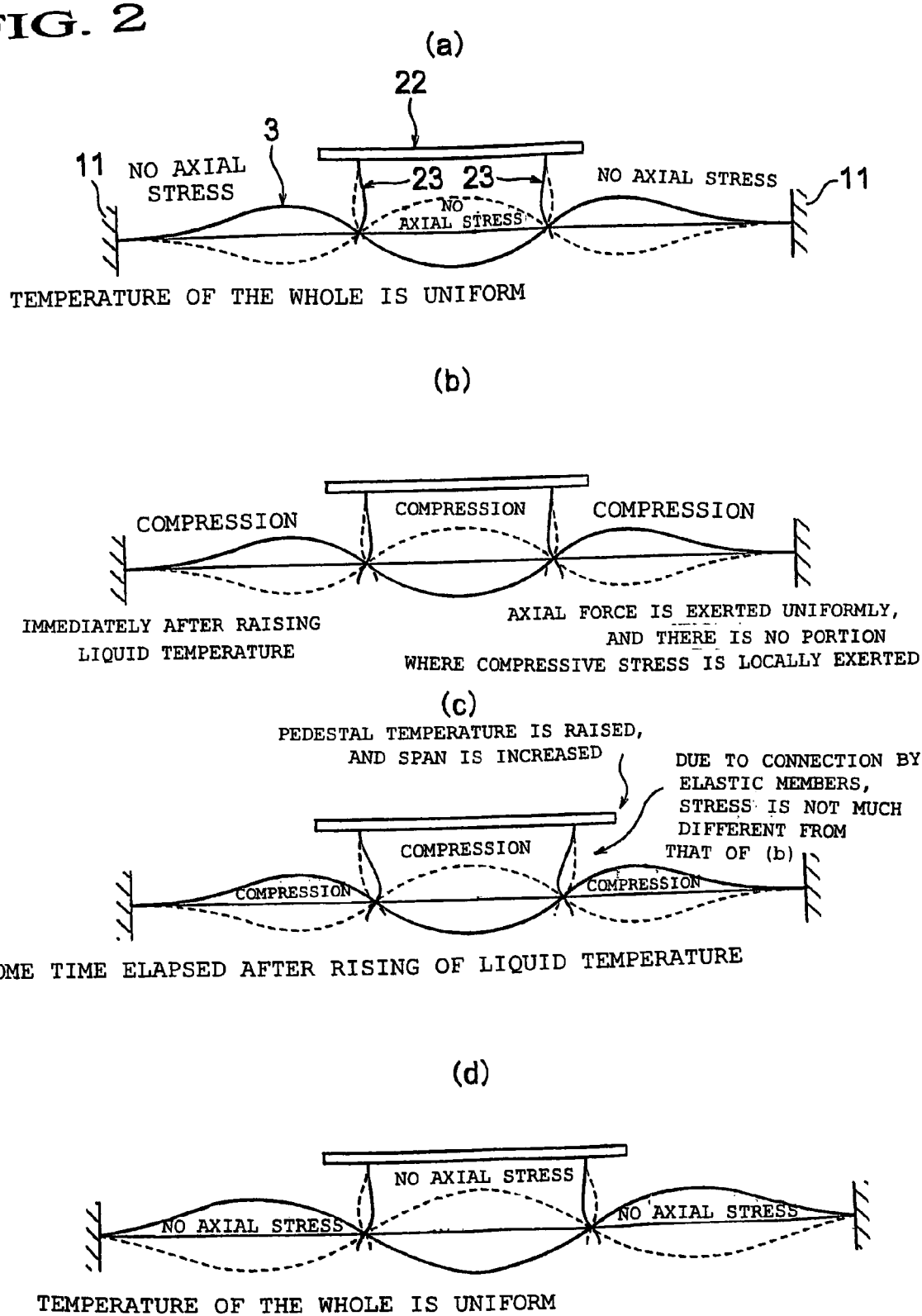
FIGS. 2(a) through 2(d) are schematic diagrams each showing the condition of the flow tube, the pedestal, and the elastic connection members when the temperature of the fluid flowing through the straight tube type Coriolis flowmeter of FIG. 1 is raised.
Figure 3:
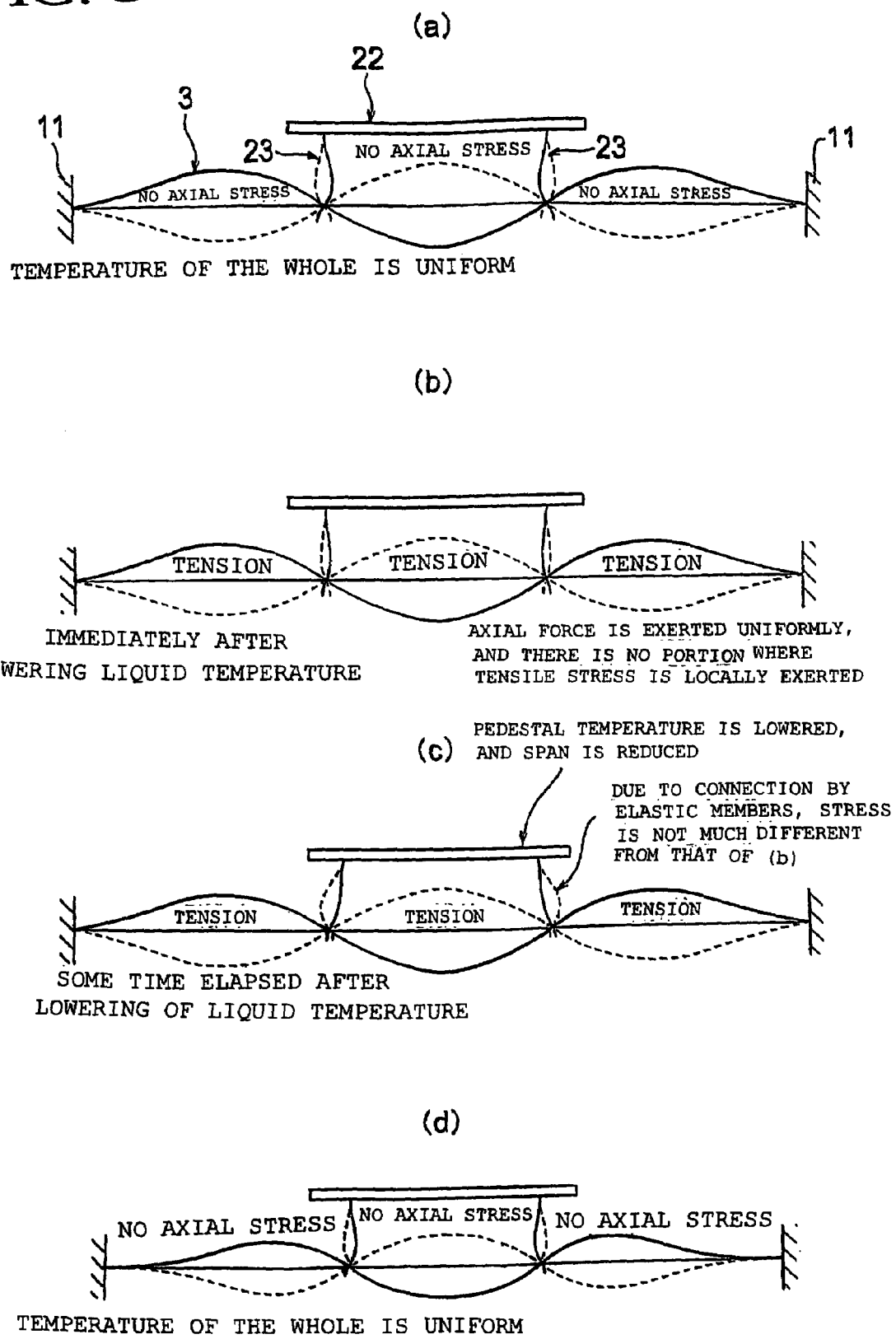
FIGS. 3(a) through 3(d) are schematic diagrams each showing the condition of the flow tube, the pedestal, and the elastic connection members when the temperature of the fluid flowing through the straight tube type Coriolis flowmeter of FIG. 1 is lowered.

In the following, the present invention will be described with reference to the drawings. FIG. 1 is a diagram showing a straight tube type Coriolis flowmeter for tertiary mode vibration with an elastic connection member and a pedestal according to an embodiment of the present invention, of which portion (a) is a sectional view of the straight tube type Coriolis flowmeter, and portion (b) is a perspective view showing the positional relationship between the flow tube, the pedestal, and the elastic connection member. Portions (a) through (d) of each of FIGS. 2 and 3 are schematic diagrams each showing the condition of the flow tube, the pedestal, and the elastic connection members when the temperature of the fluid flowing through the straight tube type Coriolis flowmeter of FIG. 1 is raised and lowered, respectively.

In FIG. 1, in order to name the components common to those of the conventional example first, a straight tube type Coriolis flowmeter 21 according to the present invention is equipped with an outer cylinder 2, a flow tube 3, a drive device 7, a pair of detectors (i.e., detection means, of which only one is shown here) 8, and a pair of connection flanges (of which only one is shown here) 11.

(The other generally adopted components are omitted here.) Further, as main components, the straight tube type Coriolis flowmeter 21 of the present invention is equipped with a pedestal 22, and a pair of elastic connection members 23 for connecting the pedestal 22 to the flow tube 3.

The straight tube type Coriolis flowmeter 21 according to the present invention is characterized by minimizing vibration leakage without having to provide the conventional counter balance 4 (see FIG. 13), by driving the flow tube 3 by tertiary mode bending vibration in order to achieve an improvement in terms of resistance to temperature change as compared with the prior art, and by being provided with the pedestal 22 and the elastic connection members 23 as additional components. Another structural feature of this flowmeter is that, there is no need to provide the conventional plate springs 6 (see FIG. 13), so the elastic connection members 23 constitutes rotatable support ends with respect to the vibrating direction of the flow tube 3. In the following, the components will be described.

The outer cylinder 2 is a so-called casing and is of a structure resistant to bending and torsion. The outer cylinder 2 is of a size allowing accommodation of the flow tube 3. The outer cylinder 2 is formed so as to be capable of protecting the main portions of the flowmeter such as the flow tube 3, that is, the sensor unit portion. The interior of the outer cylinder 2 is filled with an inert gas such as argon gas. Due to the filling with the inert gas, condensation on the flow tube 3, etc. is prevented.

The flow tube 3 has a straight tube portion 10, and trumpet-shaped divergent opening portions 9 connected to the both ends of the straight tube portion 10 (of which only one is shown). Fixed to the straight tube portion 10 are a magnet 7a constituting the drive device 7 and magnets 8a constituting the detectors 8. The magnet 7a constituting the drive device 7 is fixed to a central portion of the straight tube portion 10. On the other hand, the magnets 8a constituting the detectors 8 are fixed at positions on both sides of the magnet 7a and at equal intervals from the magnet 7a. The magnets 7a, 8a are fixed in position so as to protrude in the vibrating direction of the flow tube 3.

The flow tube 3 is vibrated in tertiary mode through driving of the drive device 7. (In other words, drive device 7 drives flow tube 3 by tertiary mode vibration.) In this embodiment, the magnets 8a are fixed to the central vibrating portions between the two nodes of the tertiary mode vibration of the flow tube 3 (exclusive of the antinode at the center). The end portions of the outer cylinder 2 and the connection flanges 11 are welded to the divergent opening portions 9.

The pedestal 22 is a tubular rigid body rectangular in section, and is arranged at the same position as the counter balance 4 (see FIG. 13) of the prior art. That is, the pedestal 22 is arranged on the outer side of the flow tube 3 so as to be out of contact with the flow tube 3. Fixed to the pedestal 22 are a coil 7b constituting the drive device 7 and coils 8b constituting the detectors 8. The coil 7b constituting the drive device 7 is fixed to a central portion of the pedestal 22. Meanwhile, the coils 8b constituting the detectors 8 are fixed in position in conformity with the positions of the magnets 8a. The coils 7b, 8b are fixed at positions where they are penetrated by the magnets 7a, 8a, respectively.

The pedestal 22 is provided as a member which does not vibrate but can maintain a fixed position during the tertiary mode vibration of the flow tube 3.

(Pedestal 22 is not a member subject to resonance like conventionally adopted counter balance 4.) The pedestal 22 is connected to the flow tube 3 through the intermediation of the elastic connection members 23.

The elastic connection members 23 are respectively fixed to the ends of the pedestal 22. The elastic connection members 23 serve to connect the pedestal 22 and the flow tube 3 to each other and also serve as elastic members. The elastic connection members 23 are mounted, for example, at two positions corresponding to the tertiary mode node positions inherent in the flow tube 3. (The mounting positions are not restricted to the node positions.)

Here, the axial direction of the flow tube 3 will be designated as a Z-axis, the driving direction of the drive device (which is the vibrating direction of flow tube 3 and is orthogonal to the Z-axis) will be designated as an X-axis, and a direction orthogonal to the Z-axis and the X-axis will be designated as a Y-axis. The elastic connection members 23 are structured so as to exhibit lower rigidity in the Z-axis direction than in the X-axis direction and the Y-axis direction, and as to exhibit lower rigidity in a rotating direction (Ry) around the Y-axis than in a rotating direction (Rz) around the Z-axis and a rotating direction (Rx) around the X-axis. In the following, the structure of the elastic connection members 23 will be described more specifically.

Each of the elastic connection members 23 has a first wall portion 23a continuous with the flow tube 3, a second wall portion 23b continuous with the pedestal 22, and a pair of continuous wall portions 23c continuous with the first wall portion 23a and the second wall portion 23b at an end in the Y-axis direction. Further, each of the elastic connection members 23 is structured such that the first wall portion 23a and the second wall portion 23b are opposed to each other at an interval, with their end portions in the X-axis direction being open at the interval (as indicated by reference numeral 23d). The pair of continuous wall portions 23c are formed such that their width in the X-axis direction is smaller than the width in the X-axis direction of the first wall portion 23a and the second wall portion 23b. The edge portions of the continuous wall portions 23c and the first wall portion 23a and the edge portions of the continuous wall portions 23c and the second wall portion 23b are formed so as to be connected together in smooth curves.

The elastic connection members 23 are formed in a spindle-shaped configuration when seen in the Z-axis direction.

When seen in the direction of the above-mentioned openings (as indicated by reference numeral 23d), each elastic connection member 23 is formed in a configuration like a cylinder crushed in the Z-axis direction. The first wall portion 23a and the second wall portion 23b are formed so as to partially or generally exhibit curved surfaces. The first wall portion 23a has a fixing through-hole (The method of fixation is not 23e in conformity with the diameter of the flow tube 3. The second wall portion 23b has a clearance portion 23f for the flow tube 3. The second wall portion 23b is formed so as to be out of contact with the flow tube 3.

The first wall portion 23a is fixed to the flow tube 3 by brazing. The second wall portion 23b is also fixed to the end of the pedestal 22 by brazing restricted to brazing.)

Examples of the materials of the flow tube 3, the pedestal 22, and the elastic connection members 23 described above include stainless steel. Taking into account the expansion and contraction due to temperature changes, it is desirable for the materials of those three members to be ones exhibiting coefficient of linear expansion that are equal to or as close as possible to each other. In this embodiment, the pedestal 22 is formed so as to exhibit a relatively small heat capacity.

In the above-mentioned construction, when the fluid to be measured (not shown) is passed through the flow tube 3, and the drive device 7 is driven to generate a tertiary mode vibration in the flow tube 3, the mass flow rate is calculated by a signal processing portion (not shown) by a difference in phase generated by a Coriolis force at the positions of the detectors 8. Further, in this embodiment, the density is also calculated from the vibration frequency. The straight tube type Coriolis flowmeter 21 of the present invention has quite the same function as that of conventional flowmeters.

As can be seen from the above description, in the straight tube type Coriolis flowmeter 21 of the present invention, the pedestal 22 has high rigidity, and is connected to the flow tube 3 through the intermediation of the elastic connection members 23 exhibiting rigidity in the axial direction, so the flow tube 3 does not vibrate but is maintained at a fixed position while the flow tube 3 is being vibrated in tertiary mode through driving of the drive device 7. In the following, the action of the flow tube 3, the pedestal 22, and the elastic connection members 23 according to changes in the temperature of the fluid to be measured (not shown) will be described with reference to FIGS. 2 and 3.

FIG. 2 (a) schematically show a state in which the temperature of the fluid to be measured is low and in which the temperature of the straight tube type Coriolis flowmeter 21 as a whole is uniform. Further, FIG. 2(a) shows a state in which the flow tube 3 is being vibrated in tertiary mode through driving of the drive device 7.

In this state, no axial stress has been generated yet over the flow tube 3 as a whole. (However, stress due to the vibration is separately applied to flow tube 3.)

FIG. 2 (b) schematically shows a state immediately after a rise in the temperature of the fluid to be measured. At this time, the heat due to the change in the temperature of the fluid to be measured is not conducted to the pedestal 22 to a sufficient degree, so there is no change in its entire length, nor is there any change in the distance between the pair of connection flanges 11 (between the fixed ends), with the result there is generated in the flow tube 3 an axial stress leading to compression due to the change in the temperature of the fluid to be measured. This axial stress leading to compression is exerted uniformly over the entire flow tube 3. This is due to the fact that since the pair of elastic connection members 23 are formed of an elastic material, they undergo elastic deformation, which helps to prevent generation of local axial stress as observed in the prior art. Thus, in the above-mentioned state, the axial stress generated in the flow tube 3 is dispersed in the axial direction of the flow tube 3 due to the structure of the present invention.

FIG. 2 (c) schematically shows a state in which some time has elapsed after a rise in the temperature of the fluid to be measured. At this time, the pedestal 22, which has a relatively small heat capacity as stated above, adapts itself relatively quickly to the heat due to the temperature change, with the result that the pedestal 22 expands in the total length direction. As stated above, the pair of connection members 23 exhibit lower rigidity in the axial direction of the flow tube 3 (the Z-axis direction) than in the other directions, so the above-mentioned expansion is absorbed by elastic deformation. Unlike the prior art, the axial stress is dispersed in the axial direction of the flow tube 3 between the pair of elastic connection members 23 and between the elastic connection members 23 and the connection flanges 11 (fixed ends). Thus, as in the state of FIG. 2(b), in the state of FIG. 2(c), no local axial stress is generated. (There is scarcely any change in axial stress from the state of FIG. 2(b).)

FIG. 2 (d) schematically shows a state in which the temperature of the straight tube type Coriolis flowmeter 21 as a whole has become uniform. In this state, the pedestal 22 and the distance between the fixed ends expand to the full as the flow tube 3, so the axial stress which has been acting on the flow tube 3 until then ceases to exist, with the result that the state of the straight tube type Coriolis flowmeter 21 is stabilized.

FIG. 3 (a) schematically show a state in which the temperature of the fluid to be measured is high and in which the temperature of the straight tube type Coriolis flowmeter 21 as a whole is uniform. Further, FIG. 3(a) schematically shows a state in which the flow tube 3 is being vibrated in tertiary mode through driving of the drive device 7. In this state, as in the state of FIG. 2(a), no axial stress has been generated over the flow tube 3 as a whole. (However, stress due to the vibration is separately applied to flow tube 3.)

FIG. 3 (b) schematically shows a state immediately after a drop in the temperature of the fluid to be measured. At this time, the coldness due to the drop in the temperature of the fluid to be measured is not conducted to the pedestal 22 to a sufficient degree, so there is no change in its entire length, nor is there any change in the distance between the pair of connection flanges 11 (between the fixed ends), with the result there is generated in the flow tube 3 an axial stress leading to tension due to the change in the temperature of the fluid to be measured. This axial stress leading to tension is exerted uniformly over the entire flow tube 3. This is due to the fact that, as in the case described above, since the pair of elastic connection members 23 are formed of an elastic material, they undergo elastic deformation, which helps to prevent generation of local axial stress as observed in the prior art. Thus, in the above-mentioned state, the axial stress generated in the flow tube 3 is dispersed in the axial direction of the flow tube 3 due to the structure of the present invention.

FIG. 3 (c) schematically shows a state in which some time has elapsed after a drop in the temperature of the fluid to be measured. At this time, the pedestal 22, which has a relatively small heat capacity as stated above, adapts itself relatively quickly to the coldness due to the temperature change, with the result that the pedestal 22 contracts in the total length direction. As stated above, the pair of connection members 23 exhibit lower rigidity in the axial direction of the flow tube 3 (the Z-axis direction) than in the other directions, so the above-mentioned contraction is absorbed by elastic deformation. Unlike the prior art, the axial stress is dispersed in the axial direction of the flow tube 3 between the pair of elastic connection members 23 and between the elastic connection members 23 and the connection flanges 11 (fixed ends). Thus, as in the state of FIG. 3(b), in the state of FIG. 3(c), no local axial stress is generated. (There is scarcely any change in axial stress from the state of FIG. 3(b).)

FIG. 3(d) shows a state in which the temperature of the straight tube type Coriolis flowmeter 21 as a whole has become uniform. In this state, the pedestal 22 and the distance between the fixed ends contract to the full as the flow tube 3, so the axial stress which has been acting on the flow tube 3 until then ceases to exist, with the result that the state of the straight tube type Coriolis flowmeter 21 is stabilized.

As described above with reference to FIGS. 1 through 3, in the straight tube type Coriolis flowmeter 21 of the present invention, if a temperature change occurs in the fluid to be measured and the flow tube 3 expands or contracts, the axial stress acting on the flow tube 3 is dispersed in the axial direction of the flow tube 3 (the Z-axis direction), so a structure resistant to temperature change is obtained, making it advantageously possible to achieve an improvement over the prior art in terms of the temperature characteristic of a flowmeter.

Further, in the straight tube type Coriolis flowmeter 21 of the present invention, the flow tube 3 is vibrated in tertiary mode, so it is advantageously possible to minimize vibration leakage. Regarding vibration leakage, in the straight tube type Coriolis flowmeter 21 of the present invention, there is no need to provide the plate springs 6 as used in the prior art (see FIG. 13), so it is advantageously possible to eliminate the vibration leakage conventionally generated through the plate springs 6.

Further, in the straight tube type Coriolis flowmeter 21 of the present invention, there is no need to provide the counter balance 4 (see FIG. 13) as used in the prior art, so it is advantageously possible to eliminate the unbalance caused by a change in the density of the fluid to be measured and by the moment of inertia (mass) of the counter balance 4, that is, the unbalance due to the fact that the moment of inertia of the counter balance 4 remains fixed even if the density of the fluid to be measured is changed.

Thus, it is advantageously possible to eliminate instrumental error shift, variation, and, further, the shift with respect to density measurement (frequency).

Further, in the straight tube type Coriolis flowmeter 21 of the present invention, the pedestal 22 does not vibrate during the vibration of the flow tube 3, so when routing wiring (not shown) for the coils 7*b*, 8*b* fixed to the pedestal 22 from the outer cylinder 2, there is no need to impart looseness (taking the vibration into consideration) to the wiring, so it is advantageously possible to increase the degree of freedom in terms of wiring design.

Figure 4:
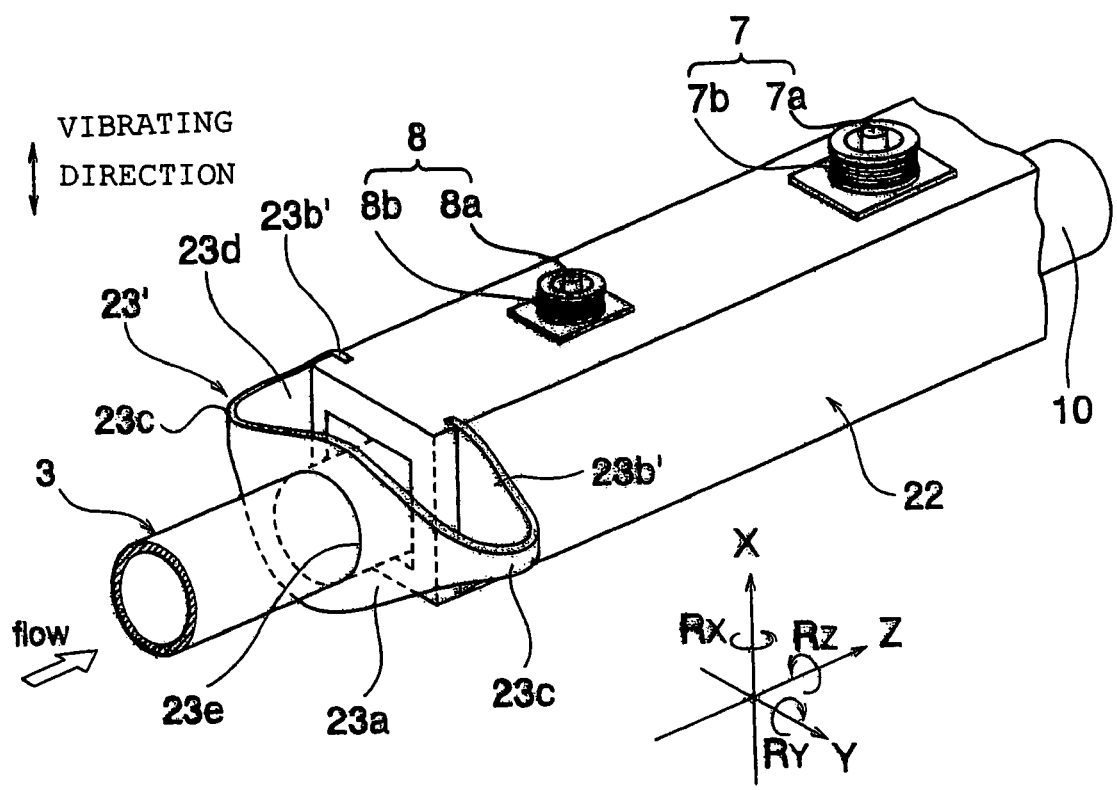
FIG. 4 is a perspective view of another example of the elastic connection member of FIG. 1.

Next, another example of the elastic connection members 23 of FIG. 1 will be described with reference to FIG. 4. FIG. 4 is a perspective view of the other example of one of the elastic connection members.

In FIG. 4, an elastic connection member 23' according to the other example has the first wall portion 23*a* continuous with the flow tube 3, a pair of second wall portions 23*b'* continuous with the pedestal 22, and the pair of continuous wall portions 23*c* continuous with the first wall portion 23*a* and the second wall portions 23*b'* at the ends in the Y-axis direction. The elastic connection member 23' of the other example is formed such that the fixation of the second wall portions 23*b'* continuous with the pedestal 22 is somewhat different from that of the second wall portions 23*b* of the elastic connection member 23 of FIG. 1. (Apart from this fixation, this elastic connection member is completely the same as the elastic connection member 23 of FIG. 1.)

The elastic connection member 23' is structured so as to exhibit lower rigidity in the Z-axis direction than in the X-axis direction and the Y-axis direction, and as to exhibit lower rigidity in the rotating direction (Ry) around the Y-axis than in the rotating direction (Rz) around the Z-axis and the rotating direction (Rx) around the X-axis. As shown in the drawing, the second wall portions 23*b'* are fixed in position while inserted into grooves (with no reference numeral) formed in the side walls in the Y-axis direction of the pedestal 22. The second wall portions 23*b'* are fixed to the side walls in the Y-axis direction of the pedestal 22 by, for example, brazing.

Figure 5:
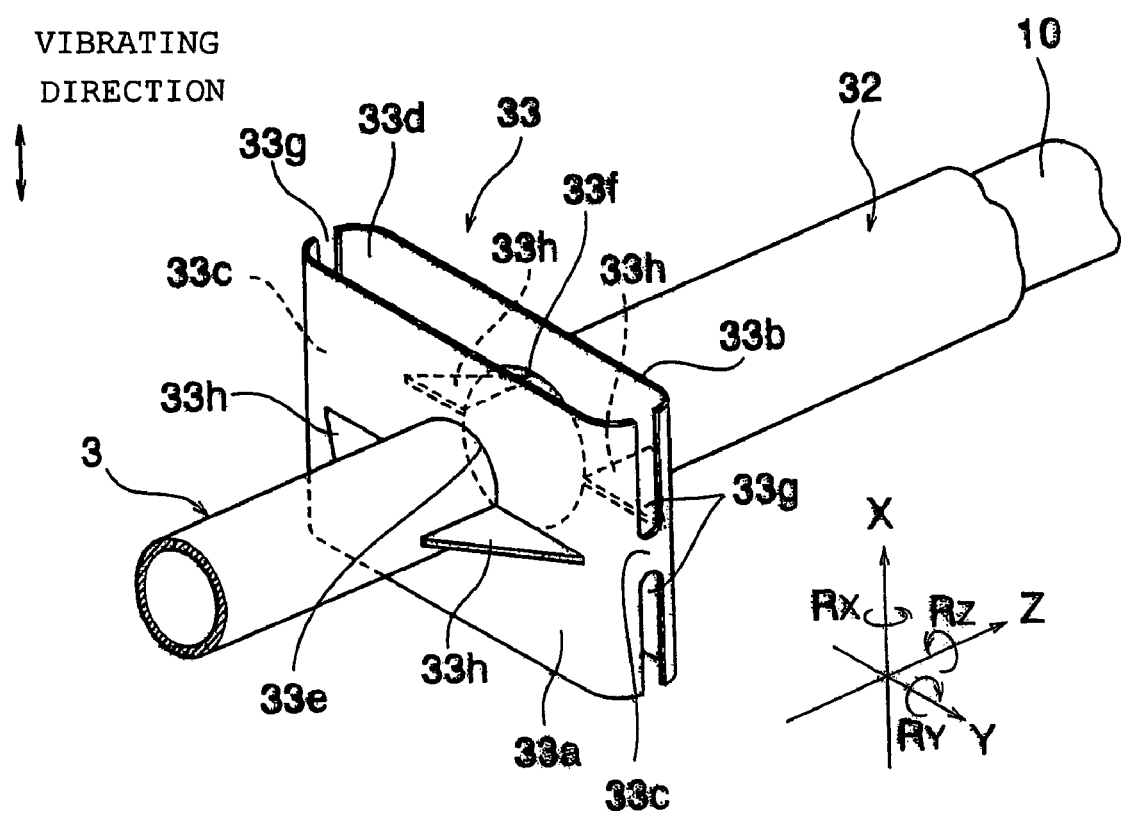
FIG. 5 is a perspective view of another example of the elastic connection member and the pedestal of FIG. 1.

Next, another example of the elastic connection members and the pedestal of FIG. 1 will be described with reference to FIG. 5. FIG. 5 is a perspective view of one of the elastic connection members and the pedestal of the other example.

Figure 13:
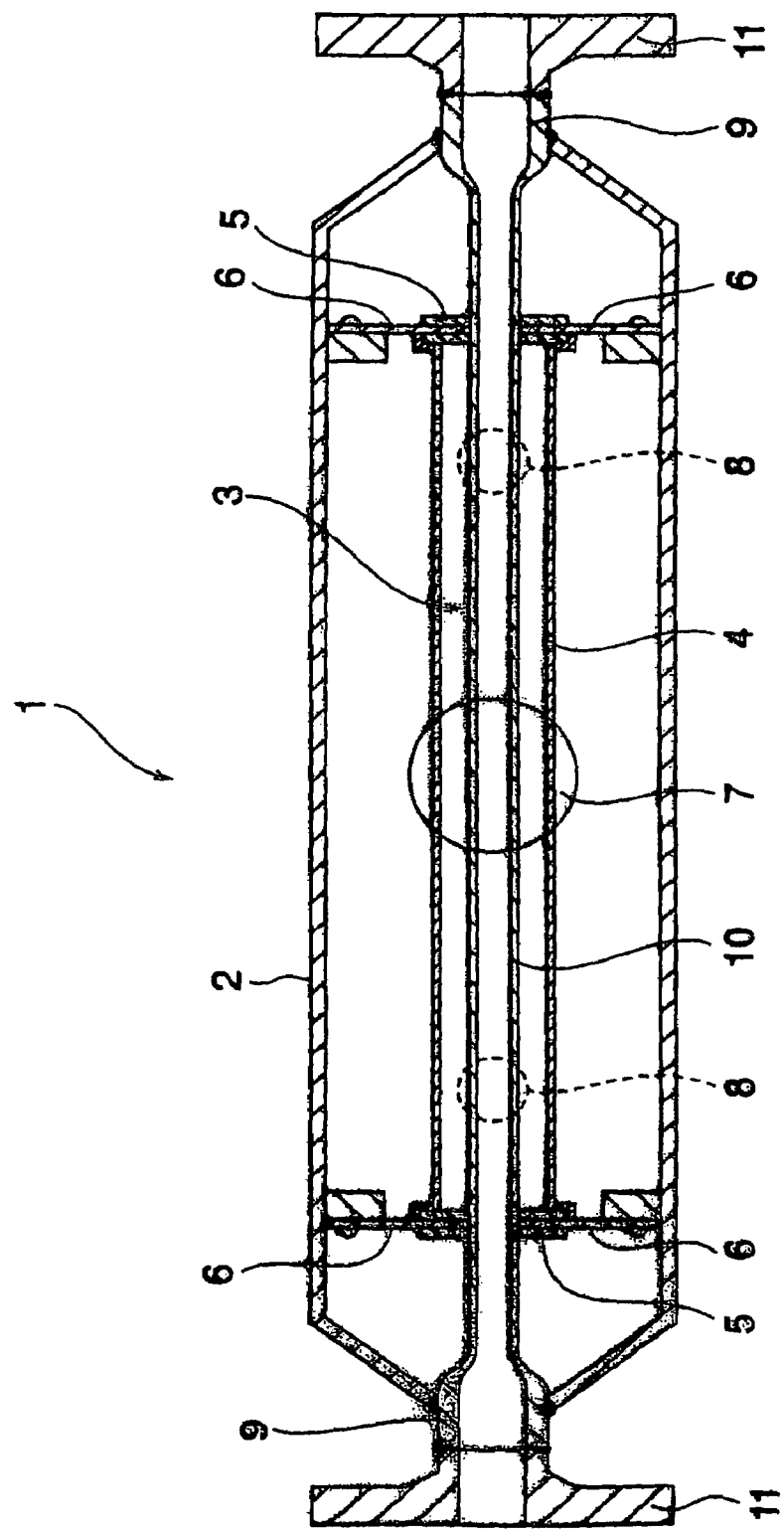
FIG. 13 is a sectional view of a conventional straight tube type Coriolis flowmeter.
Figure 14:
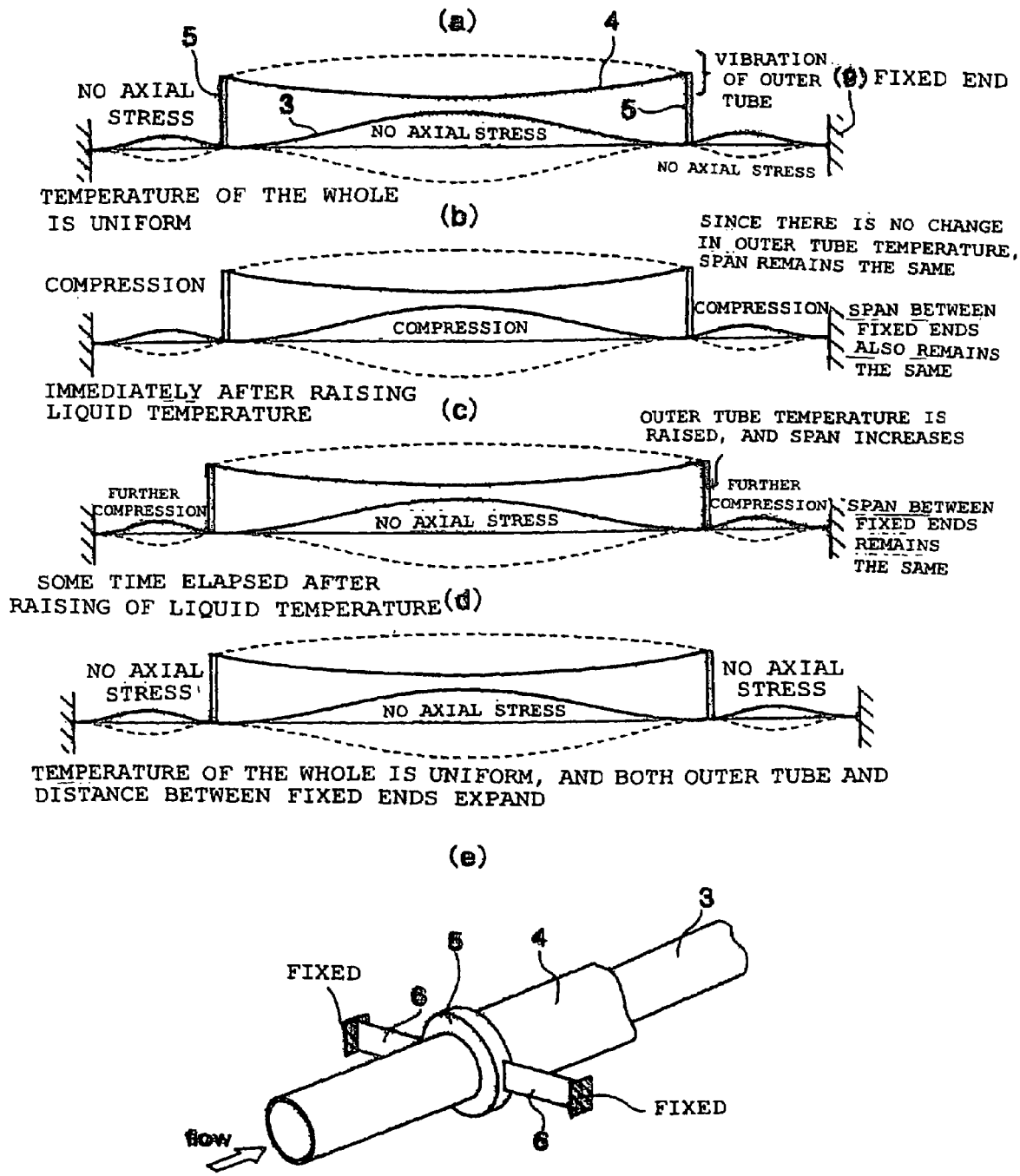
FIGS. 14 (a) through 14 (d) are schematic diagrams showing the condition of the flow tube and the counter balance when the temperature of the fluid flowing through the straight tube type Coriolis flowmeter of FIG. 13 is raised, and FIG. 14 (e) is a perspective view of the flow tube, the counter balance, and the connection block.
Figure 15:
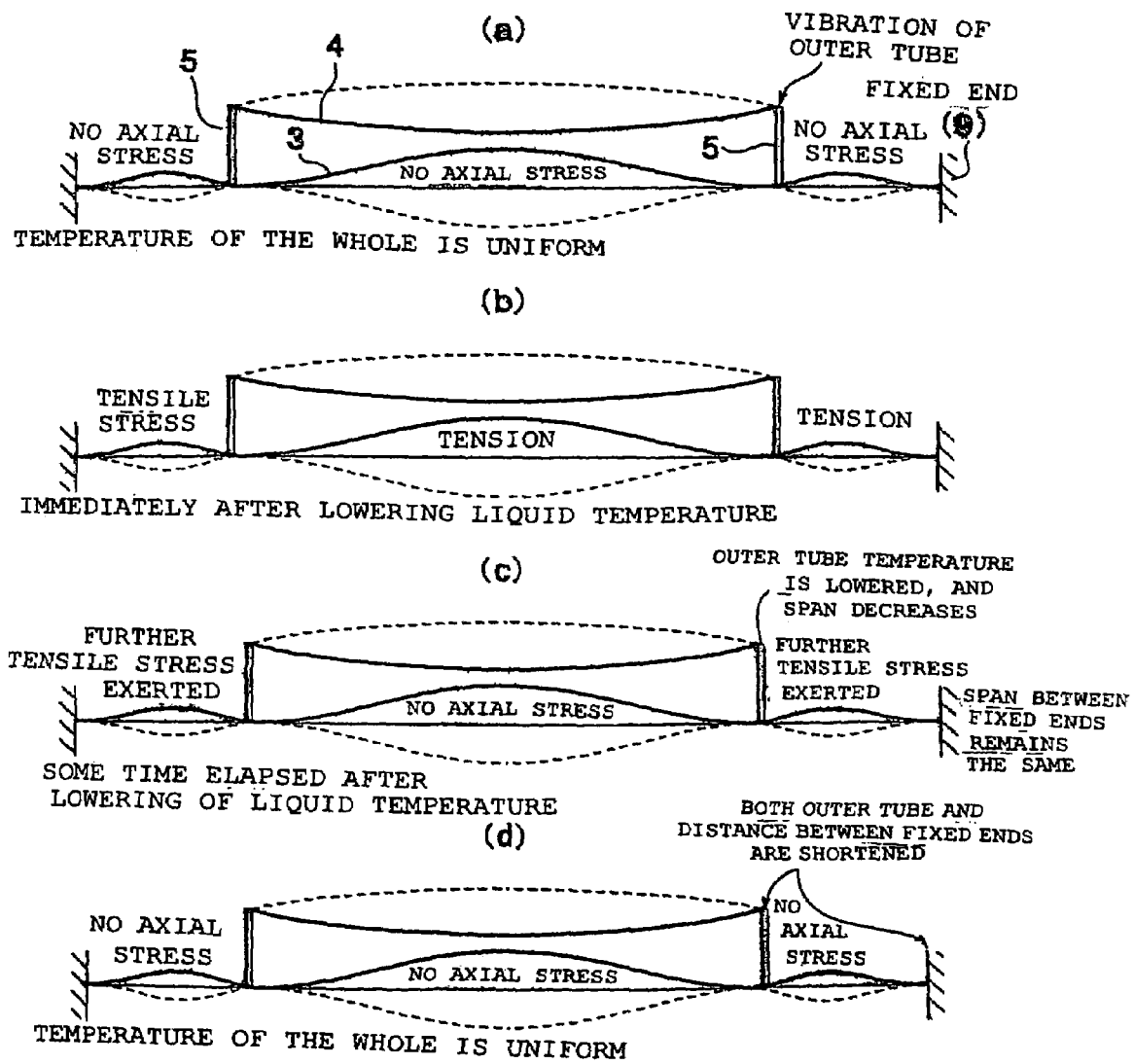
FIGS. 15 (a) through 15 (d) are schematic diagrams showing the condition of the flow tube and the counter balance when the temperature of the fluid flowing through the straight tube type Coriolis flowmeter of FIG. 13 is lowered.

In FIG. 5, a pedestal 32 is a tubular body circular in section (cylinder) and is a rigid body, and is arranged at the same position as the counter balance 4 in the prior art (see FIG. 13). That is, the pedestal 32 is arranged on the outer side of the flow tube 3 so as to be out of contact with the flow tube 3. Although not shown in particular, fixed to the pedestal 32 are the coil 7*b* constituting the drive device 7 and the coils 8*b* constituting the detectors 8. The pedestal 32 is provided as a member which does not vibrate during tertiary mode vibration of the flow tube 3 and which can be maintained at a fixed position. The pedestal 32 is connected to the flow tube 3 through the intermediation of elastic connection members 33.

The elastic connection members 33 are respectively connected to the ends of the pedestal 32. The elastic connection members 33 serve to connect the pedestal 32 and the flow tube 3 to each other and also serve as elastic members. The elastic connection members 33 are mounted, for example, at two positions corresponding to the tertiary mode node positions inherent in the flow tube 3. (The mounting positions are not restricted to the node positions.) The elastic connection members 33 are structured so as to exhibit lower rigidity in the Z-axis direction than in the X-axis direction and the Y-axis direction, and as to exhibit lower rigidity in the rotating direction (Ry) around the Y-axis than in the rotating direction (Rz) around the Z-axis and the rotating direction (Rx) around the X-axis.

Each of the elastic connection members 33 has a first wall portion 33*a* continuous with the flow tube 3, a second wall portion 33*b* continuous with the pedestal 32, and a pair of continuous wall portions 33*c* continuous with the first wall portion 33*a* and the second wall portion 33*b* at the ends in the Y-axis direction. Further, the elastic connection member 33 is formed such that the first wall portion 33*a* and the second wall portion 33*b* are opposed to each other through the intermediation of an interval and that its ends in the X-axis direction are open by the above-mentioned interval (as indicated by reference numeral 33*d*). The pair of continuous wall portions 33*c* are formed such that their width in the X-axis direction is smaller than the width of the first wall portion 33*a* and the second wall portion 33*b* in the X-axis direction. The pair of continuous wall portions 33*c* are formed as shown in the drawing by pairs of slits 33*g* each formed in the X-axis direction and opposed to each other.

When seen from the opening side (indicated by reference numeral 33*d*) (i.e., in the X-axis direction), the elastic connection member 33 is formed like a cylinder crushed in the Z-axis direction. The first wall portion 33*a* and the second wall portion 33*b* are formed so as to partially or generally exhibit curved surfaces. The first wall portion 33*a* has a fixing through-hole 33*e* in conformity with the diameter of the flow tube 3. Further, the second wall portion 33*b* has a clearance portion 33*f* for the flow tube 3. The second wall portion 33*b* is formed so as to be out of contact with the flow tube 3.

Each of the first wall portion 33*a* and the second wall portion 33*b* has at its center a pair of ribs 33*h* extending in the Y-axis direction. The first wall portion 33*a* side ribs 33*h* are fixed not only to the first wall portion 33*a* but also to the flow tube 3. The second wall portion 33*b* side ribs 33*h* are fixed not only to the second wall portion 33*b* but also to the pedestal 32. The ribs 33*h* are provided as a means for adjusting the rigidity in the Z-axis direction of the elastic connection member 33. As in the other example, the fixation of the elastic connection member 33 is effected by brazing.

The effects of the pedestal 32 and the elastic connection member 33 are the same as those described with reference to FIGS. 1 through 4, and will be omitted here. Further, the effects obtained by a combination of the pedestal 32 and the elastic connection member 23 of FIG. 1 and the effects obtained by a combination of the elastic connection member 33 and the pedestal of FIG. 1 are also the same, and will be omitted here likewise. Further, the effects of the elastic connection members described below are also the same, and will be omitted likewise.

Figure 6:
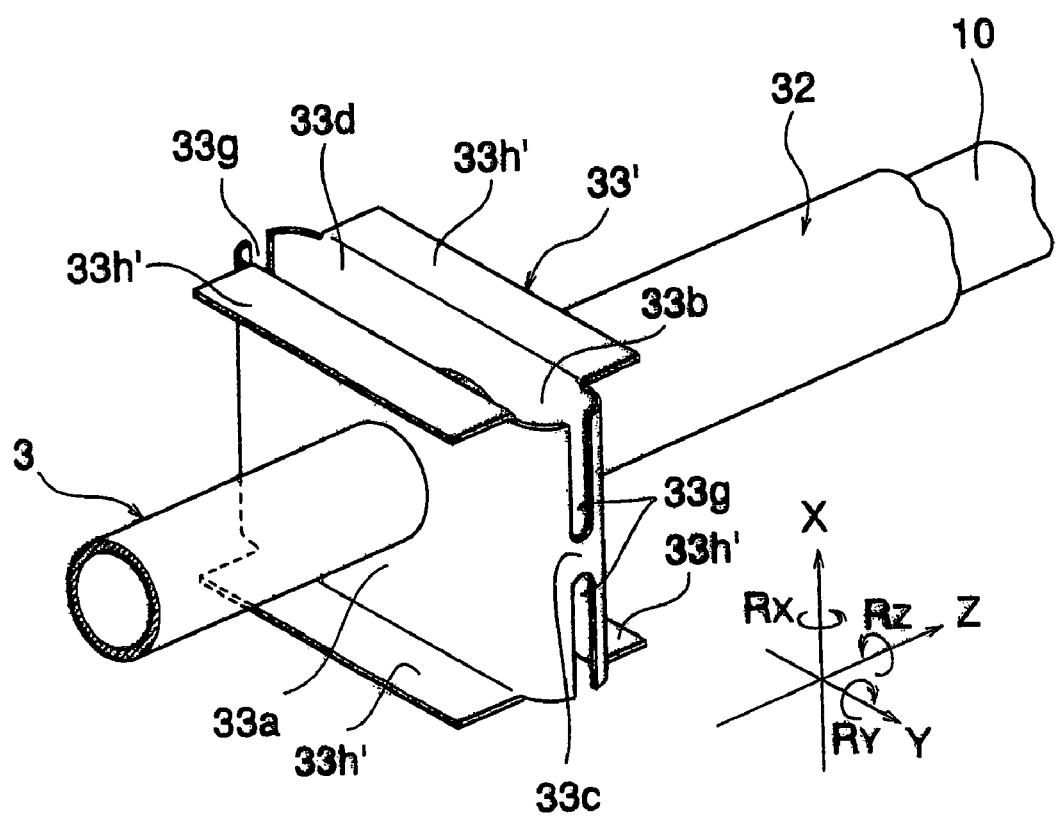
FIG. 6 is a perspective view of another example of the elastic connection member of FIG. 5.

Next, another example of the elastic connection member of FIG. 5 will be described with reference to FIG. 6. FIG. 6 is a perspective view of an elastic connection member according to the other example.

In FIG. 6, an elastic connection member 33' differs from that of FIG. 5 in the arrangement of ribs 33h'. That is, the ribs 33h' are formed at the ends in the X-axis direction of the first wall portion 33a and the second wall portion 33b. This makes this example different from that shown in FIG. 5. Further, the ribs 33h' differ from those of FIG. 5 in that they are not fixed to the flow tube 3 and the pedestal 32.

Figure 7:
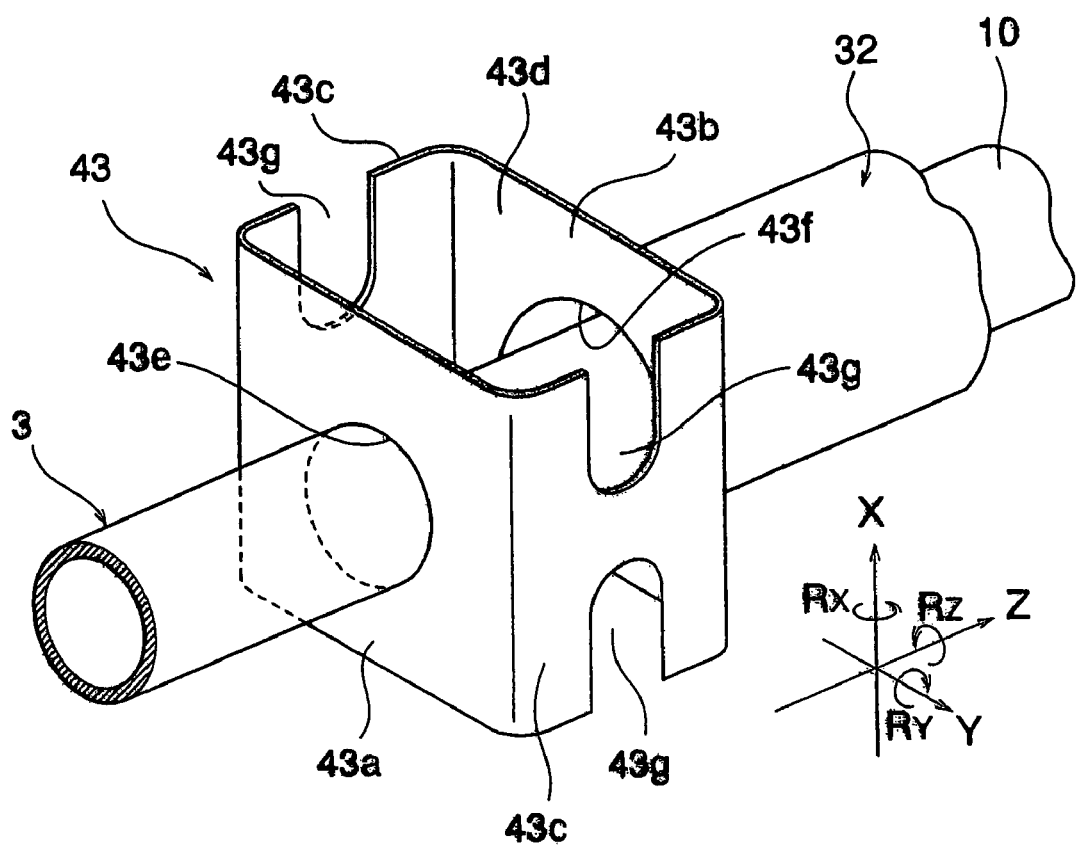
FIG. 7 is a perspective view of another example of the elastic connection member of FIG. 5.

Next, another example of the elastic connection member of FIG. 5 will be described with reference to FIG. 7. FIG. 7 is a perspective view of an elastic connection member according to the other example.

In FIG. 7, elastic connection members 43 are fixed to both ends of the pedestal 32. The elastic connection members 43 serve to connect the pedestal 32 and the flow tube 3 to each other and also serve as elastic members. The elastic connection members 43 are mounted, for example, at two positions corresponding to the tertiary mode node positions inherent in the flow tube 3. (The mounting positions are not restricted to the node positions.) The elastic connection members 43 are structured so as to exhibit lower rigidity in the Z-axis direction than in the X-axis direction and the Y-axis direction, and as to exhibit lower rigidity in the rotating direction (Ry) around the Y-axis than in the rotating direction (Rz) around the Z-axis and the rotating direction (Rx) around the X-axis.

Each of the elastic connection member 43 has a first wall portion 43a continuous with the flow tube 3, a second wall portion 43b continuous with the pedestal 32, and a pair of continuous wall portions 43c continuous with the first wall portion 43a and the second wall portion 43b at the ends in the Y-axis direction. Further, the elastic connection member 43 is formed such that the first wall portion 43a and the second wall portion 43b are opposed to each other through the intermediation of an interval and that its ends in the X-axis direction are open by the above-mentioned interval (as indicated by reference numeral 43d). The pair of continuous wall portions 43c are formed as shown in the drawing by pairs of slits 43g formed in the X-axis direction and opposed to each other. Due to the presence of the slits 43g, the pair of continuous wall portions 43c are formed such that their width in the X-axis direction is partially smaller than the width of the first wall portion 43a and the second wall portion 43b in the X-axis direction.

The elastic connection member 43 is formed in a substantially rectangular configuration in plan view. The first wall portion 43a has a fixing through-hole 43e in conformity with the diameter of the flow tube 3. The second wall portion 43b has a circular clearance portion 43f for the flow tube 3. The second wall portion 43b is formed so as to be out of contact with the flow tube 3. As in the other examples, the fixation of the elastic connection member 43 is effected by brazing.

Next, other examples of the elastic connection member of FIG. 5 will be described with reference to FIGS. 8(a) through 8(f). FIGS. 8(a) through 8(f) are perspective views of elastic connection members according to the other examples.

Figure 8:
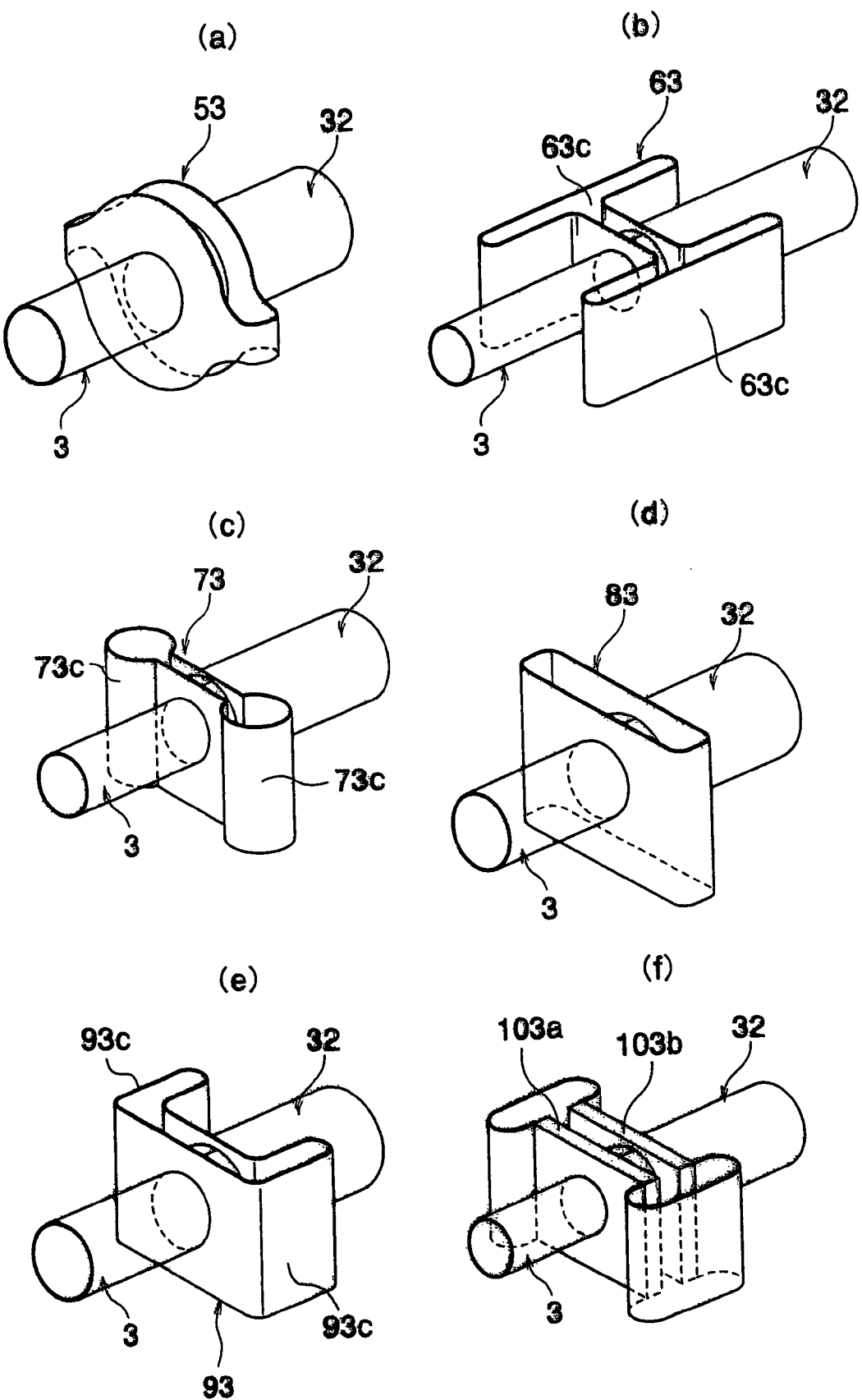
FIGS. 8 (a) through 8 (f) are perspective views of other examples of the elastic connection member of FIG. 5.

An elastic connection member 53 shown in FIG. 8 (a) is basically the same as the elastic connection member 23 of FIG. 1, and is formed in a spindle-shaped configuration. An elastic connection member 63 shown in FIG. 8(b) has a pair of continuous wall portions 63c each extending in the axial direction of the flow tube 3 and the pedestal 32. An elastic connection member 73 shown in FIG. 8(c) has a pair of continuous wall portions 73c formed in a substantially cylindrical configuration. An elastic connection member 83 shown in FIG. 8(d) is formed by eliminating the slits 43g from the elastic connection member 43 of FIG. 7. Further, in the elastic connection member 83 of FIG. 8 (d), the distance between the first wall portion 43a and the second wall portion 43b of the elastic connection member 43 of FIG. 7 is reduced. In an elastic connection member 93 of FIG. 8 (e), a pair of continuous wall portions 93c extend in the axial direction of the pedestal 32. In contrast to the elastic connection member 63 of FIG. 8 (b), an elastic connection member 103 shown in FIG. 8(f) has formed such that a first wall portion 103a and a second wall portion 103b have rigidity.

Next, another example of the elastic connection member and the pedestal of FIG. 1 will be described with reference to FIG. 9. FIG. 9 (a) is a perspective view of an elastic connection member and a pedestal according to the other example. FIG. 9 (b) is a front view of the elastic connection member of FIG. 9(a), and FIG. 9(c) is an explanatory view illustrating fixing positions for detectors. In the example of FIG. 9, the detectors 8 are fixed to vibrating portions between the two nodes F of the tertiary mode vibration of the flow tube 3 and fixed ends K. (This example is also applicable to a case in which detectors 8 are fixed to the central vibrating portion between two nodes F (exclusively of antinode H.))

As can be seen from FIG. 9, a pedestal 112 and elastic connection members 113 are of a structure somewhat different from those of the above-mentioned examples. In the following, the structure of the pedestal 112 and the elastic connection members 113 will be described specifically.

The pedestal 112 is formed as a rigid tubular member of a rectangular sectional configuration, and is arranged at the same position as the counter balance 4 in the prior art (see FIG. 13). That is, the pedestal 112 is arranged on the outer side of the flow tube 3 so as to be out of contact with the flow tube 3. The total length of the pedestal 112 is larger than that of the counter balance 4 in the prior art and larger than that of the pedestals of some of the above-mentioned examples.

Fixed to the pedestal 112 are the coil 7b constituting the drive device 7 and the coils 8b constituting the detectors 8. The coil 7b constituting the drive device 7 is fixed to the central portion of the pedestal 112. On the other hand, the coils 8b constituting the detectors 8 are fixed to vibrating portions between the two nodes F of the tertiary mode vibration of the flow tube 3 and the fixed ends K. Fixed to the flow tube 3 are the magnet 7a (not shown) in correspondence with the position of an antinode H of the central vibrating portion between the two nodes F of the tertiary mode vibration and the magnets 8a on vibrating portions between the two nodes F and the fixed ends K and at positions in correspondence with the coils 8b.

The pedestal 112 is provided as a member which does not vibrate during the tertiary mode vibration of the flow tube 3 and which can be maintained at a fixed position. (The pedestal 112 is not a member which resonates like counter balance 4 in the prior art.) The pedestal 112 is connected to the flow tube 3 through the intermediation of the elastic connection members 113.

The pedestal 112 is provided with a pair of openings 112a and brackets 112b for connection with the elastic connection members 113. The openings 112a are formed in the side walls in the Y-axis direction of the pedestal 112. The openings 112a are formed as through-holes. The brackets 112b are formed so as to be capable of fixing in position the end portions 113c in the Y-axis direction of the elastic connection members 113 described below. In this embodiment, they are formed in the configuration as shown in the drawing and are capable of fixing in position the end portions 113c protruding outwardly through the openings 112a. The brackets 112b are configured so as to exhibit low rigidity in the Z-axis direction. It is also possible for the brackets 112b to be included in the constructions of the elastic connection members 113.

As shown in the drawing, each elastic connection member 113 is formed in a spindle-shaped flat-plate structure continuous with the flow tube 3. The elastic connection members 113 serve to connect the pedestal 112 and the flow tube 3 to each other and also serve as elastic members. The elastic connection members 113 are mounted, for example, at two positions corresponding to the tertiary mode node positions inherent in the flow tube 3. (The mounting positions are not restricted to the node positions.) Each elastic connection member 113 has at its center a fixing through-hole 113a in conformity with the diameter of the flow tube 3. The elastic connection member 113 is formed such that the width in the X-axis direction of the end portions 113c in the Y-axis direction is smaller than the width in the X-axis direction of the continuous portion 113b continuous with the flow tube 3. The elastic connection member 113 is formed such that the edge portions thereof are connected in smooth curves from the continuous portion 113b to the end portions 113c. The continuous portion 113b is fixed to the flow tube 3 by brazing. Further, the end portions 113c are also fixed to the brackets 112b by brazing. (The method of fixation is not restricted to brazing.)

Next, another example of the elastic connection member and the pedestal of FIG. 9 will be described with reference to FIG. 10. FIG. 10 (a) is a perspective view of an elastic connection member and a pedestal according to the other example, and FIG. 10(b) is a front view of the elastic connection member of FIG. 10(a).

In FIG. 10, a pedestal 112' differs from that of FIG. 9 solely in the configuration of brackets 112b' thereof. Further, an elastic connection member 113' differs from that of FIG. 9 in that there are added to the end portions 113c thereof torsion bars (torsion beams) 113d' extending in the Y-axis direction. The brackets 112b' and the torsion bars 113d' are fixed to each other by brazing. (The fixing method is not restricted to brazing.) In the drawing, the circles in dotted lines indicate the mounting positions for the coils 7b, 8b.

Figure 11:
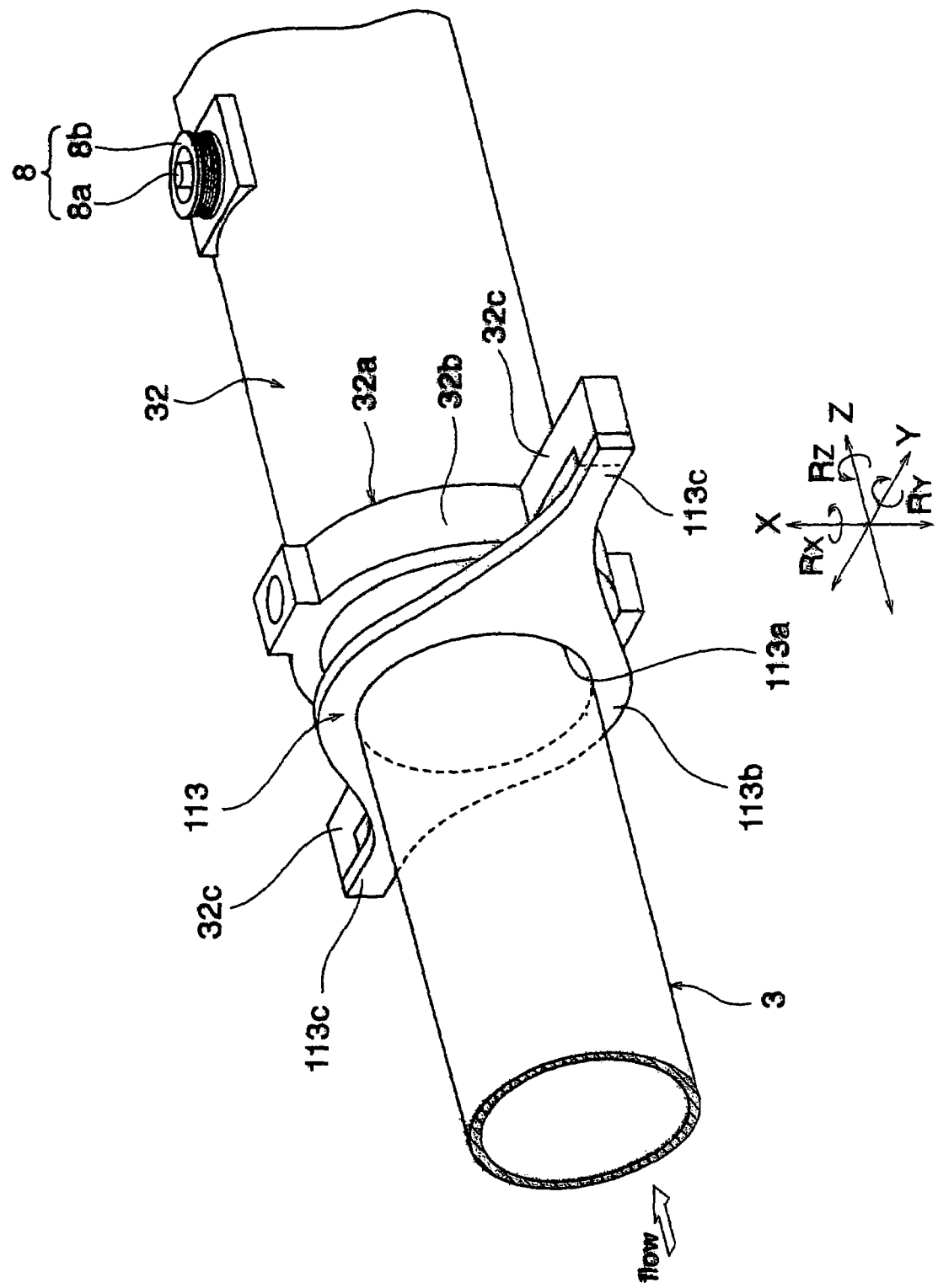
FIG. 11 is a perspective view of another example of the elastic connection member and the pedestal of FIG. 9.

Next, another example of the elastic connection member and the pedestal of FIG. 9 will be described with reference to FIG. 11. FIG. 11 is a perspective view of an elastic connection member and a pedestal according to the other example.

In FIG. 11, the above-mentioned pedestal 32 is used as the pedestal arranged on the outer side of the flow tube 3 so as to be out of contact with the flow tube 3. Fixed to the pedestal 32 are the coil 7b (not shown) constituting the drive device 7 and the coils 8b constituting the detectors 8. The coil 7b (not shown) constituting the drive device 7 is fixed at the central position of the pedestal 32. The coils 8b constituting the detectors 8 are fixed to the central vibrating portion (exclusive of the antinode at the center) between the two tertiary mode vibration nodes of the flow tube 3. The magnet 7a (not shown) and the magnets 8a are fixed to the flow tube 3.

The pedestal 32 is connected to the flow tube 3 through the intermediation of the elastic connection members 113 described above. The pedestal 32 is provided as a member which does not vibrate during the tertiary mode vibration of the flow tube 3 and which can be maintained at a fixed position. The pedestal 32 is connected to the flow tube 3 through the intermediation of the elastic connection members 113 described above. Provided at both ends of the pedestal 32 are brackets 32a for connection with the elastic connection members 113.

Each bracket 32a is formed so as to be capable of fixing in position the end portions 113c in the Y-axis direction of the elastic connection member 113. Each bracket 32a has an annular fixation portion 32b fixed to the outer periphery of the pedestal 32 and arm portions 32c extending in the Y-axis direction. The end portions 113c of the elastic connection member 113 are fixed to the distal ends of the arm portions 32c by brazing (The fixing method is not restricted to brazing).

Each elastic connection member 113 is formed in a spindle-shaped flat-plate structure continuous with the flow tube 3. The elastic connection members 113 serve to connect the pedestal 32 and the flow tube 3 to each other and also serve as elastic members. The elastic connection members 113 are mounted, for example, at two positions corresponding to the tertiary mode node positions inherent in the flow tube 3. (The mounting positions are not restricted to the node positions.)

Figure 12:
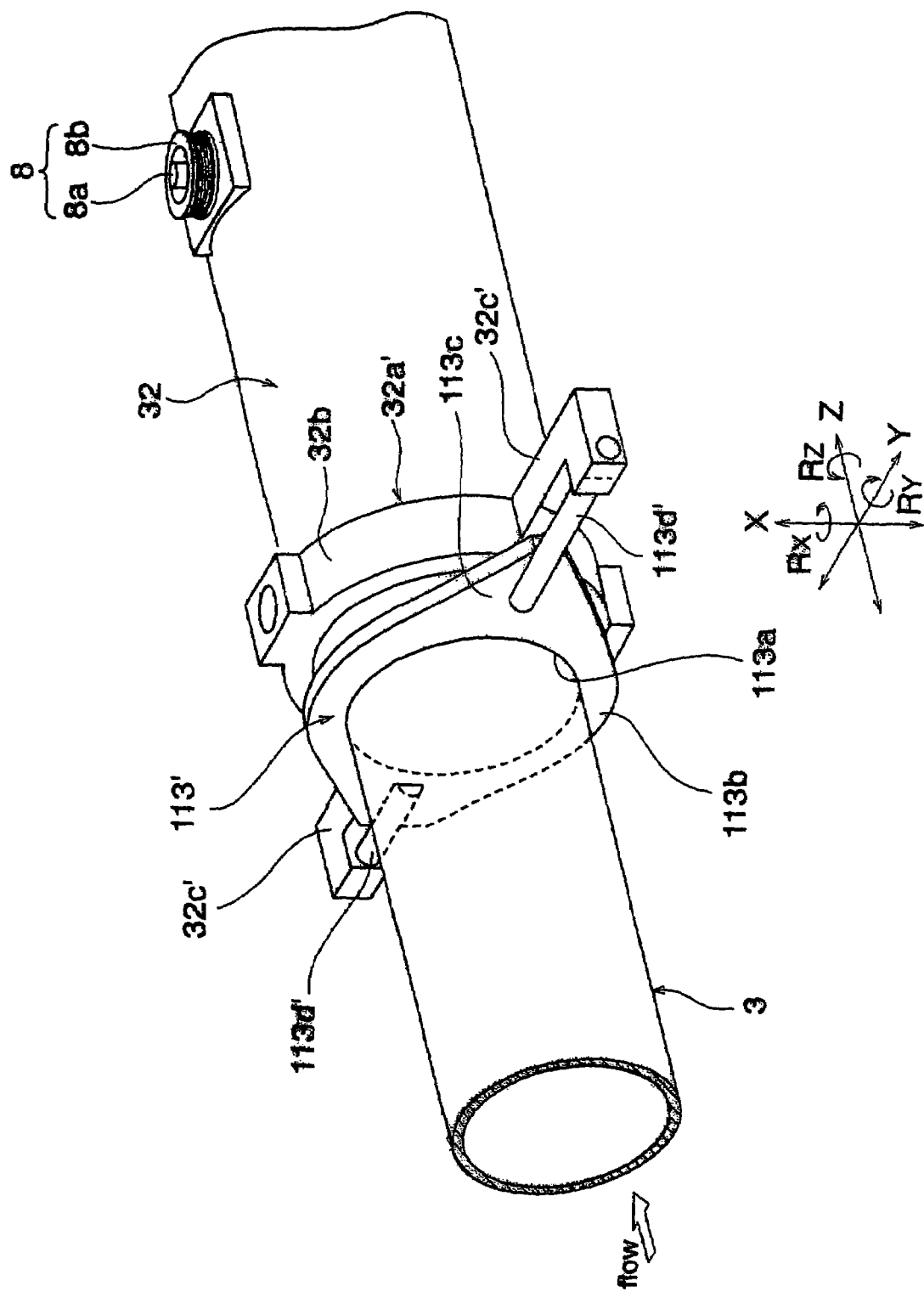
FIG. 12 is a perspective view of another example of the elastic connection member and the pedestal of FIG. 11.

Next, another example of the elastic connection member and the pedestal of FIG. 11 will be described with reference to FIG. 12. FIG. 12 is a perspective view of an elastic connection member and a pedestal according to the other example.

In FIG. 12, the pedestal 32 differs from that of FIG. 11 solely in the configuration of brackets 32a' thereof. Further, the elastic connection member 113' differs from that of FIG. 11 in that there are added to the end portions 113c thereof torsion bars (torsion beams) 113d' extending in the Y-axis direction. Arm portion 32c' of the brackets 32a' and the torsion bars 113d' are fixed to each other by razing. (The fixing method is not restricted to brazing.)

Further, it goes without saying that the present invention allows various modifications without departing from the gist of the present invention.

The invention claimed is:

1. A straight tube type Coriolis flowmeter for tertiary mode vibration with an elastic connection member and a pedestal, comprising:
   a straight-tube-type flow tube through which a fluid to be measured flows;
   a drive device for driving the flow tube by a tertiary mode vibration;
   a pair of detection means for detecting a phase difference proportional to a Coriolis force acting on the flow tube;
   a rigid pedestal situated on the outer side of the flow tube while keeping coils of the drive device and of the pair of detection means fixed in position; and
   a pair of elastic connection members connecting the pedestal to the flow tube at two predetermined positions of the flow tube, wherein, assuming that
      an axial direction of the flow tube is a Z-axis,
      a driving direction of the drive device orthogonal to the Z-axis is an X-axis, and
      a direction orthogonal to the Z-axis and the X-axis is a Y-axis,
   the elastic connection members are of a structure exhibiting
      lower rigidity in the Z-axis direction than in the X-axis direction and the Y-axis direction, and
      lower rigidity in a direction of rotation around the Y-axis than in a direction of rotation around the Z-axis and a direction of rotation around the X-axis.

2. A straight tube type Coriolis flowmeter for tertiary mode vibration with an elastic connection member and a pedestal according to claim 1,
   wherein each of the elastic connection members has
      a first wall portion continuous with the flow tube, a second wall portion continuous with the pedestal, and a pair of continuous wall portions continuous respectively with the first wall portion and the second wall portion at end portions in the Y-axis direction, wherein the first wall portion and the second wall portion are opposed to each other at an interval, and wherein end portions in the X-direction of each elastic connection member are open by virtue of the interval.

3. A straight tube type Coriolis flowmeter for tertiary mode vibration with an elastic connection member and a pedestal according to claim 2, wherein each of the elastic connection members is structured such that a width in the X-axis direction of the continuous wall portions is smaller than a width in the X-axis direction of the first wall portion and the second wall portion.

4. A straight tube type Coriolis flowmeter for tertiary mode vibration with an elastic connection member and a pedestal according to claim 3, wherein the pedestal is a tubular member of a rectangular sectional configuration.

5. A straight tube type Coriolis flowmeter for tertiary mode vibration with an elastic connection member and a pedestal according to claim 3, wherein the flow tube, the pedestal, and the elastic connection members are structures of the same coefficients of linear expansion.

6. A straight tube type Coriolis flowmeter for tertiary mode vibration with an elastic connection member and a pedestal according to claim 2, wherein the pedestal is a tubular member of a rectangular sectional configuration.

7. A straight tube type Coriolis flowmeter for tertiary mode vibration with an elastic connection member and a pedestal according to claim 2, wherein the flow tube, the pedestal, and the elastic connection members are structures of the same coefficients of linear expansion.

8. A straight tube type Coriolis flowmeter for tertiary mode vibration with an elastic connection member and a pedestal according to claim 1, wherein the elastic connection members are of a spindle-shaped flat-plate structure continuous with the flow tube, and wherein the pedestal is provided with brackets for fixing in position end portions in the Y-axis direction of the elastic connection members protruding to an exterior of the pedestal through openings of the pedestal.

9. A straight tube type Coriolis flowmeter for tertiary mode vibration with an elastic connection member and a pedestal according to claim 8, wherein the pedestal is a tubular member of a rectangular sectional configuration.

10. A straight tube type Coriolis flowmeter for tertiary mode vibration with an elastic connection member and a pedestal according to claim 8, wherein the flow tube, the pedestal, and the elastic connection members are structures of the same coefficients of linear expansion.

11. A straight tube type Coriolis flowmeter for tertiary mode vibration with an elastic connection member and a pedestal according to claim 1, wherein the pedestal is a tubular member of a rectangular sectional configuration.

12. A straight tube type Coriolis flowmeter for tertiary mode vibration with an elastic connection member and a pedestal according to claim 11, wherein the flow tube, the pedestal, and the elastic connection members are structures of the same coefficients of linear expansion.

13. A straight tube type Coriolis flowmeter for tertiary mode vibration with an elastic connection member and a pedestal according to claim 1, wherein the flow tube, the pedestal, and the elastic connection members are structures of the same coefficients of linear expansion.

* * * * *